United States Patent [19]

Blichowski

[11] Patent Number: 5,572,455
[45] Date of Patent: Nov. 5, 1996

[54] ADDER-SUBTRACTOR DEVICE AND METHOD FOR MAKING THE SAME

[76] Inventor: Tadeusz Blichowski, 2718 W. Julia Ct., Chicago, Ill. 60647-4013

[21] Appl. No.: 333,568

[22] Filed: Nov. 2, 1994

Related U.S. Application Data

[63] Continuation-in-part of Ser. No. 123,731, Dec. 1, 1993, abandoned.

[51] Int. Cl.$^6$ ..................................................... G06F 7/50
[52] U.S. Cl. ............................................................. 364/746.2
[58] Field of Search ................................. 364/746.2, 768, 364/786

[56] References Cited

U.S. PATENT DOCUMENTS

| | | | |
|---|---|---|---|
| 3,462,589 | 8/1969 | Robertson | 364/746.2 |
| 4,838,646 | 6/1989 | Lasher et al. | 364/746.2 |
| 4,866,657 | 9/1989 | Nishiyama et al. | 364/746.2 |
| 4,979,140 | 12/1990 | Darley | 364/746.2 |

OTHER PUBLICATIONS

Arizienis, "Binary-Compatible Signed-Digit Arithmetic" *Proceedings—Fall Joint Computer Conference*, 1964 pp. 663–672.

*Primary Examiner*—David H. Malzahn
*Attorney, Agent, or Firm*—Peter K. Trzyna; Baker & McKenzie

[57] ABSTRACT

An adder-subtractor includes a jth device for each bit position j for computing a result for an expression $\pm a_0 \pm a_1$, where $a_0$ and $a_1$ are binary numbers. The jth device is from a group of devices, the group being defined by formulas using integer parameters k, $p_0$, $p_1$, t, $x_0$, $x_1$, $y_0$, and $y_1$, each of the parameters having a integer value that is 0 or 1. The jth device includes a line carrying an input $a_{1j}$ representing a jth digit of the $a_1$ number. The jth device further includes a line carrying an input $w_{1j}=1-y_1$ when $s_1=1-x_1$ and if a previous bit position of the $a_1$ number is 1, and $w_{1j}=y_1$ when $s_1=1-x_1$ and there is no 1 on previous bit position. A plurality of switches, between the lines, direct to the forward output $F_{out}$ a bit value, according to one of said formulas:

$$F_{out}=(1-p_k)(s_k \oplus x_k)(w_{kj} \oplus y_k) \oplus a_{kj} \oplus t$$

if $$p_0(s_0 \oplus x_0) \oplus (1-p_0)(s_0 \oplus x_0)(w_{0j} \oplus y_0) \oplus a_{0j}=p_1(s_1 \oplus x_1) \oplus (1-p_1)(s_1 \oplus x_1)(w_{1j} \oplus y_1) \oplus a_{1j},$$

the plurality of switches, also for directing the forward input $F_{in}$ to the output $c_j$ such that the output is according to another of said formulas:

$$c_j=(1-p_0)(s_0 \oplus x_0)(w_{0j} \oplus y_0) \oplus a_{0j} \oplus (1-p_1)(s_1 \oplus x_1)(w_{1j} \oplus y_1) \oplus a_{1j} \oplus (1-(s_k \oplus x_k)p_k)(s_{1-k} \oplus x_{1-k})p_{1-k} \oplus t \oplus F_{in} \oplus p_0 \cdot p_1 (s_0 \oplus x_0)(s_1 \oplus x_1)((w_{0j} \oplus y_0) \oplus (w_{1j} \oplus y_1) \oplus (w_{0j} \oplus y_0)(w_{1j} \oplus y_1)).$$

The adder-subtractor can also have the plurality of switches directing the forward input $F_{in}$ to the forward output $F_{out}$ if $$p_0(s_0 \oplus x_0) \oplus (1-p_0)(s_0 \oplus x_0)(w_{0j} \oplus y_0) \oplus a_{0j} \neq p_1(s_1 \oplus x_1) \oplus (1-p_1)(s_1 \oplus x_1)(w_{1j} \oplus y_1) \oplus a_{1j}. +EA$$

27 Claims, 7 Drawing Sheets

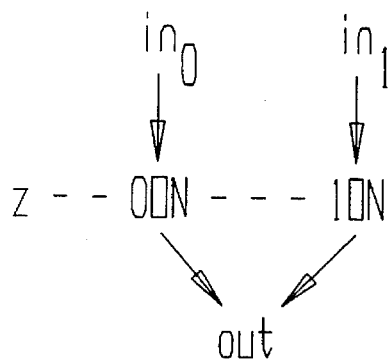
FIG. 6
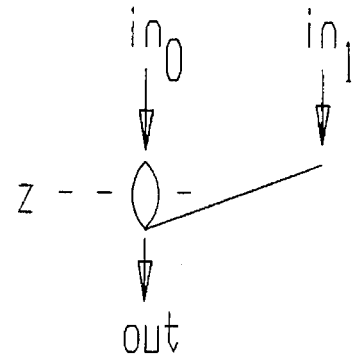
FIG. 7
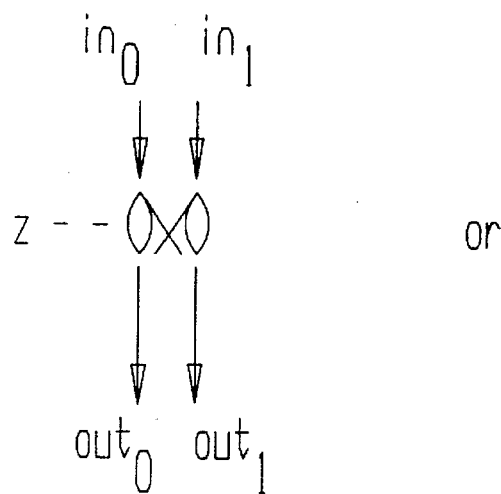
or
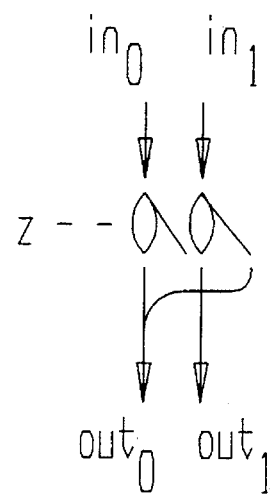
FIG. 8
FIG. 9

5,572,455

ADDER-SUBTRACTOR DEVICE AND METHOD FOR MAKING THE SAME

CROSS-REFERENCE TO RELATED APPLICATIONS

This patent application is a continuation-in-part of the patent application Ser. No. 08/123,731, now abandoned, filed Dec. 1, 1993.

FIELD OF THE INVENTION

This invention pertains to calculating devices. More particularly, the present invention involves devices and methods relating to an adder-subtractor. The adder-subtractor can be of the electronic, optical, mechanical, hydraulic, or pneumatic type.

BACKGROUND OF THE INVENTION

There are many kinds of adders and subtractors known in the prior art. Some are analog devices, but for handling many digits with speed and accuracy, the primary focus has turned to digital signal-processing devices. Many kinds of digital adders and subtractors have been explored in the prior art, as described for example in Hill, Fredrick J. and Peterson, Gerald R., *Introduction to Switching Theory and Logic Design*, 3rd ed. (Wiley 1981).

Those known digital adders and subtractors rely on sequential processing. That is, integers being added and subtracted are digitalized into representations having a number of bits in bit positions. For each bit position there are levels of gaging, whereby a result computed by each bit position device is fed into the next bit position device in a cascade of devices: "The addition process may thus be carried out one digit at a time, starting with the least significant digit." *Switching Theory* at page 176. (This gives rise to the notion of a "carry" propagation from one bit position to the next—a signal output from the device computing the first bit to the device computing the next bit position.)

A consequence of such prior art designs processing is slowed by the levels of gaging and the sequence of processing used to add and subtract integers represented with more than one bit. In applications requiring speed, the slowness of the sequential processing is a serious consequence.

Also, according to *Switching Theory* at pages 180–181, "there are, unfortunately, no simple rules or completely specified procedures for finding such designs." Thus, it is difficult to design device, in the absence of a generalized method.

Further, the adders and subtractors of the known prior art must each find a way to deal with the respective signs of the integers. For example, the sign at the first number can be treated as positive and the sign at the second number can be used in specifying that there is addition or subtraction of the two numbers. Often the handling of the signs of the respective integers limits the flexibility of the device and adds delay to the processing.

Additionally, a design in the known prior art that can be implemented in one media, say, electrical, may be unworkably difficult to implement in another media, say, optical. Limited flexibility is another problem in the prior art.

SUMMARY OF THE INVENTION

Accordingly, several representative objects and advantages of my invention are as follows:

An object of the present invention is to provide a fast apparatus, and methods related thereto, for digital addition and subtraction of integers.

Another object of the present invention is to provide an apparatus, and methods related thereto, that handles all bit positions of the integers simultaneously to ensure a short time period for performing arithmetical operations.

Yet another object of the present invention is to provide an apparatus, and methods related thereto, that combines addition and subtraction in the handling of the signs for the respective integers.

Yet another object of the present invention is to permit a minimal number of interconnections and relations between the parts of the adder-subtractor devices, and to allow for different species (having different interconnections and relations between the parts).

Yet another object of the present invention is to provide a simple adder-subtractor in which switches can be set up only once to obtain an addition or subtraction result with as little as one clock cycle.

Still another object of the present invention is to provide adder-subtractor device designs that can be constructed in electronic, optical, mechanical, hydraulic, pneumatic, and other equivalent embodiments.

A further object of the present invention is to provide an adder-subtractor that can be used as a counter.

These and other objects apparent from the disclosure are accomplished with the invention of a class of adder-subtractor devices, along with the methods for making and using the class of devices. The class can be considered a genus of which each species can be considered a part of the instant invention.

More particularly, the adder-subtractor device includes a jth device for each bit position j (any number of j devices) for computing a result c for an expression $\pm a_0 \pm a_1$, where $a_0$ and $a_1$ are binary numbers. The jth device is from a group of devices defined by formulas using integer parameters $k$, $p_0$, $p_1$, $t$, $x_0$, $x_1$, $y_0$, and $y_1$, each of the parameters having an integer value that is zero or one. The jth device includes a line carrying an input $s_0$. The input $s_0$ represents $x_0$ if the sign at the $a_0$ number in the expression is positive, and $s_0$ represents $1-x_0$ if the sign at the $a_0$ number in the expression is negative. The jth device also includes a line carrying an input $a_{0j}$ representing a jth digit of the $a_0$ number. Further, there is a line carrying an input $s_1$ representing $x_1$ if the sign at the $a_1$ number in the expression is positive, and representing $1-x_1$ if the sign at the $a_1$ number in the expression is negative. Further, the jth device includes a line carrying an input $a_{1j}$ representing a jth digit of the $a_1$ number. The jth device further includes a line carrying an input $w_{0j}=1-y_0$ if $s_0=1-x_0$ and if a previous bit position of the $a_0$ number is 1, and $w_{0j}=y_0$ if $s_0=1-x_0$ and if there is no 1 at a previous bit position. The jth device further includes a line carrying an input $w_{1j}=1-y_1$ if $s_1=1-x_1$ and if a previous bit position of the $a_1$ number is 1, and $w_{1j}=y_1$ if $s_1=1-x_1$ and if there is no 1 at a previous bit position. The jth device further includes at least one line carrying a forward input $F_{in}$, at least one line carrying a forward output $F_{out}$, and a line carrying an output $c_j$ representing a jth digit of the result c from computing the expression $\pm a_0 \pm a_1$. Further, between the previously mentioned lines, there is a plurality of switches, switching gates, or an equivalent means for directing the forward input $F_{in}$ to the output $c_j$ according to one of the formulas:

$$c_j = (1-p_0)(s_0 \oplus x_0)(w_{0j} \oplus y_0) \oplus a_{0j} \oplus (1-p_1)(s_1 \oplus x_1)$$

$$(w_{1j} \oplus y_1) \oplus a_{1j} \oplus (1-(s_k \oplus x_k)p_k)(s_{1-k} \oplus x_{1-k})p_{1-k} \oplus t \oplus F_{in}$$

$$\oplus p_0 \cdot p_1(s_0 \oplus x_0)(s_1 \oplus x_1)((w_{0j} \oplus y_0) \oplus (w_{1j} \oplus y_1) \oplus (w_{0j} \oplus y_0)(w_{1j} \oplus y_1)),$$

the plurality of switches or equivalent means also for directing a bit value to the forward output $F_{out}$ according to an other of the formulas:

$$F_{out} = (1-p_k)(s_k \oplus x_k)(w_{kj} \oplus y_k) \oplus a_{kj} \oplus t$$

if $$p_0(s_0 \oplus x_0) \oplus (1-p_0)(s_0 \oplus x_0)(w_{0j} \oplus y_0) \oplus a_{0j} = p_1(s_1 \oplus x_1) \oplus (1-p_1)(s_1 \oplus x_1)(w_{1j} \oplus y_1) \oplus a_{1j}.$$

The adder-subtractor can also have the plurality of switches, gates, or equivalent means direct the forward input $F_{in}$ to the forward output $F_{out}$ if $$p_0(s_0 \oplus x_0) \oplus (1-p_0)(s_0 \oplus x_0)(w_{0j} \oplus y_0) \oplus a_{0j} \neq p_1(s_1 \oplus x_1) \oplus (1-p_1)(s_1 \oplus x_1)(w_{1j} \oplus y_1) \oplus a_{1j}.$$

The present invention is fast because the plurality of switches for directing can have all switching therein set essentially simultaneously, rather than sequentially. Thus, integer addition and subtraction can be handled with as little as one clock cycle.

The present invention has an improved manner for handling the signs of the respective integers because the plurality of switches for directing combines the two integers (negative, positive, or 0's) and handles the signs at the integers essentially simultaneously.

The present invention provides for design ease because a generalized method of designing adder-subtractor devices is provided by the formulas such that species can be designed as versions of the formulas simplified to cover particular applications or situations.

The present invention also is more flexible because designs can be constructed in electronic, optical mechanical, hydraulic, or pneumatic embodiments.

BRIEF DESCRIPTION OF THE DRAWINGS

FIG. 6 is a diagram of a V switch.

FIG. 7 is another diagram of a V switch.

FIG. 8 is a diagram of an 0X0 switch.

FIG. 9 is another diagram Λ switches.

DETAILED DESCRIPTION OF THE INVENTION

Figure 1:
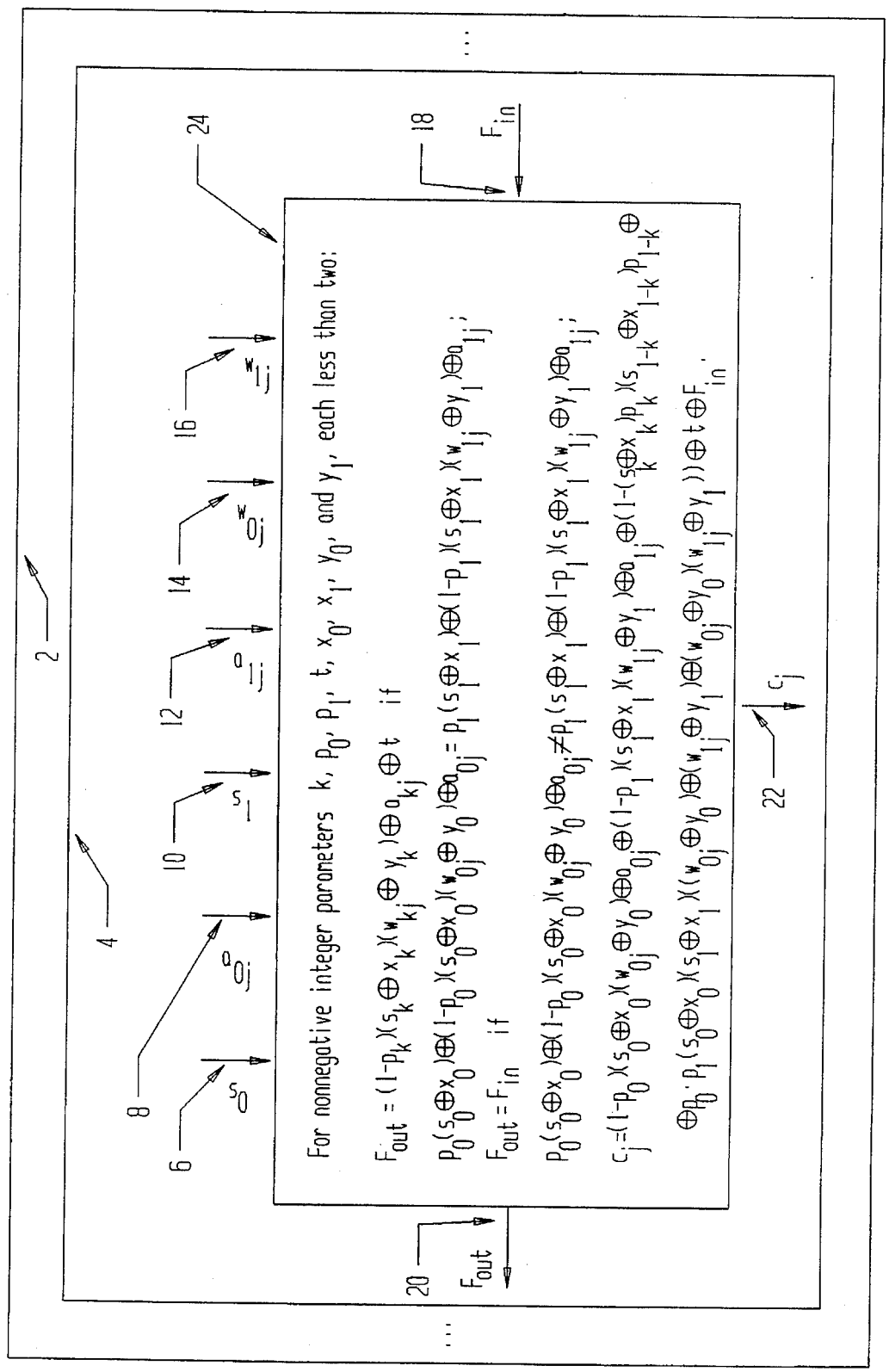
FIG. 1 is a diagram an adder-subtractor according to the present invention.

In the present invention, positive and negative binary integers are represented as follows: The integer zero is denoted by "(0)".

For non-zero integers, the sign of the integer can be designated by the most significant bit (which can be represented in parentheses), i.e., "the sign bit." For example, if the sign bit is (0) the number is nonnegative, and if the sign bit is (1) the number is negative. As a further example, consider the number +1 represented by two digits: (0)1. The first bit (0) designates the sign of the number such that a (0) indicates a nonnegative sign in contrast to the alternative of a (1) which would indicate a negative sign. The second bit 1 designates the value of the number. A value for a number is not changed by repeating the sign bit to the left of the number. Thus, with the notation used herein, (0)01=(0)1. The left side of the immediately forgoing equality is an extended form of the right side of the equality because the second 0 on the left side merely repeats the sign for the number having a value of 1.

More particularly, consider the two examples in Example 1 in which "a" with a subscript represents a respective binary digit of a number, as does "b" with a subscript.

EXAMPLE 1

$$(0)a_4a_3a_2a_1=(0)00a_4a_3a_2a_1$$

and $$(1)b_3b_2b_1=(1)1111b_3b_2b_1.$$

Both examples in Example 1 illustrate that all but one of the same leading bits can be ignored when defining the sign and the value of a multidigit number. That is, in a multidigit number, leading zeros can be reduced to one bit (0), and leading ones can be reduced to (1) to get a compact form of the integer. (Compact integers contain less digits and occupy less memory space.)

An integer can be represented as a two's complement in m_bits in an extension of the compact form through repetition the sign bit to the mth-position. This is illustrated in the two examples of Example 2.

EXAMPLE 2

$$(1)=(1)11111$$

and $$(0)=(0)00000.$$

An operational symbol for a sum $\oplus$ can be defined as follows for bits x, y=0 or 1:

$x \oplus y = |x-y|$ is equal to a distance between x and y. Accordingly, the following properties exist:

$x \oplus y = y \oplus x$ = remainder from $(x+y)$ divided by 2;

$NOT\ x = 1 \oplus x = |1-x| = 1-x;$ $(x \oplus y) \oplus u = x \oplus (y \oplus u) = x \oplus y \oplus u;$ among three bits x', y', and z' two are identical, and the sum $x' \oplus y' \oplus z'$ is equal to the remaining bit. Example 3 below shows these properties

EXAMPLE 3

$0 \oplus 0 = 1 \oplus 1 = 0;$ $NOT\ 1 = 1-1 = 0;$ $NOT 0 = 1 \oplus 0 = 1 - 0 = 1;$ $x' = 1, y' = 0, z' = 1, x' \oplus y' \oplus z' = y' = 0;$ $NOT(NOT\ x) = 1 - NOT\ x = 1 - (1-x) = x;$ An opposite integer is defined by the equality $b=-a$: b and $-a$ are opposite integers. However, the opposite to number zero to zero, i.e., $-(0)=(0)$.

Opposite integers can be represented (see Equation 1 below) based on the following assumptions: $a=(a_{n+1})a_n, \ldots, a_1 \neq 0$ and at least one digit in the sequence $a_n, \ldots, a_1$ is equal to 1; if the assumptions are not satisfied, then the form of the integer is extended. In the two examples in Example 4, the form of the integer represented on left side of each equality does not satisfy the assumption. Therefore, the form of the integer is extended as shown on the right side of each equality.

EXAMPLE 4

$(1)000 = (1)1000$ and $(1) = (1)1.$

An opposite numbers procedure can be defined as follows. Given an integer a, Equation 1 defines the bits of an integer b which is opposite to a, with "opposite" being defined by the equality $b=-a$, except for zero, as mentioned above.

For a nonzero integer $a = (a_{n+1})a_n \ldots a_1$ with 1 among the digits in the sequence $a_n \ldots a_1$, and a bit $a_0 = 0$, if at some bit position $p \geq 1$ the digit $a_p = 1$ and bit $a_r = 0$ for $r = p-1, \ldots, 0$, then the digits of the opposite number $b = (b_{n+1})b_n \ldots b_1$ are defined as shown by Equation 1.

$$b_j = \begin{cases} 0 & \text{if } j = p-1, \ldots, 0, \\ 1 & \text{if } j = p, \\ 1 - a_j & \text{if } j = n+1, \ldots, p+1, \end{cases} \quad \text{Equation 1}$$

In other words, to define the bits of a nonzero integer b which is opposite to a nonzero integer a, the bits $a_{n+1} \ldots a_1$ are transformed so that the bits $b_j$ at $j = p, \ldots, 1$ are identical the bits $a_j$, and the bits $b_j$ at $j = n+1, \ldots, p+1$ are different than the bits $a_j$.

Example 5 illustrates how the transformation can be carried out.

EXAMPLE 5

$a = (0)110100, b = -a = (1)001100;$ $n+1 = 7, p = 3;$ $a = (0)1, b = -(0)1 = (1)1 = (1);$ $n+1 = 2, p = 1;$ $a = (1) = (1)1, b = -(1)1 = (0)1;$ $n+1 = 2, p = 1;$ $(0)1000 = 8, -8 = -(0)1000 = (1)1000 = (1)000$ compact form.

Opposite numbers procedure can be presented in a following equivalent form. For any integer $a = (a_{n+1})a_n \ldots a_1$ and a bit position j $(n+1 \geq j \geq 1)$, define a parameter $w_j$ as follows: $w_j = 1$ if there is a previous position p $(j-1 \geq p \geq 1)$ such that $a_p = 1$; otherwise $w_j = 0$. For example, $w_1 = 0$ because does not exist position p such that $(1-1 \geq p \geq 1)$, and further $w_2 = a_1$. In other words, $w_j$ $(n+1 \geq j \geq 2)$ is equal to a maximal digit $a_{j'}$ from previous bit positions j' $(j-1 \geq j' \geq 1)$. When $b = -a$, then $b = (b_{n+2})b_{n+1}b_n \ldots b_1$ and $b_j = a_j \oplus w_j$ $(n+2 \geq j \geq 1)$, assuming that $a_{n+2} = a_{n+1}$, $w_{n+2} = w_{n+1}$ and $(b_{n+2})$ is a sign bit.

Note that unlike a complement procedure in the known prior art, which uses more than one clock cycle, opposite numbers procedure can be done during the one clock cycle for addition-subtraction.

Operations on the integers can be considered in the range or out of the range of an adder-subtractor device. Given any two binary integers $a_0$ and $a_1$ which have following compacted or extended representations in two's complement in q-bits, $(q \geq 2)$:

$a_0 = (a_{0q})a_{0q-1} \ldots a_{01}$, $(a_{0q})$ is a sign bit;

$a_1 = (a_{1q})a_{1q-1} \ldots a_{11}$, $(a_{1q})$ is a sign bit.

The integers $a_0$ and $a_1$ are in the range of the adder-subtractor if the following is true:

$-(2^{q-1}) \leq a_0, a_1 \leq (2^{q-1}) - 1$ in a decimal system, or $(1_q)0_{q-1} \ldots 0 \leq a_0, a_1 \leq (0_q)1_{q-1} \ldots 11$ in a binary system.

To calculate a result for an arithmetic expression like $\pm a_0 \pm a_1$, a choice is made as to which digit (0 or 1) is used to designate the sign in the expression of an integer $\pm a_0 \pm a_1$. If in the above expression at the integer $a_0$ there is a plus sign before the $a_0$, i.e., $+a_0$, then there is a nonnegative integer parameter such that $s_0 = x_0 = 0$. If instead there is a negative sign, i.e., $-a_0$, then $s_0 = 1 - x_0 = 1$. Also, if instead at the integer $a_1$ there is plus sign, i.e., $+a_1$, then there is a nonnegative integer parameter such that $s_1 = x_1 = 0$. If instead there is a negative sign, i.e., $-a_1$, then $s_1 = 1 - x_1 = 1$.

Accordingly, for an arithmetic expression like $\pm a_0 \pm a_1$, there are four cases of sign combinations for the integers:

$c_{00} = +a_0 + a_1$ $(s_0 = 0 \text{ and } s_1 = 0);$ $c_{01} = +a_0 - a_1$ $(s_0 = 0 \text{ and } s_1 = 1);$ $c_{10} = -a_0 + a_1$ $(s_0 = 1 \text{ and } s_1 = 0);$ $c_{11} = -a_0 - a_1$ $(s_0 = 1 \text{ and } s_1 = 1).$ To obtain digits resulting from computing $^c s_0 s_1 = \pm a_0 \pm a_1$, the following approach is used. In general, to begin, the integers $a_0$ and $a_1$ are in a compact form:

$a_o = (a_{0k})a_{0k-1} \ldots a_{01}$, $(a_{0k})$ is a sign bit, $a_1 = (a_{1n})a_{1n-1} \ldots a_{11}$, $(a_{1n})$ is a sign bit, $(k, n \geq 2).$ Let $m = \text{maximum}\{k, n\}$. Construct extended forms of $a_0$ and $a_1$ to the m+2 position as follows: $a_0 = (a_{0m+2})a_{0m+1}a_{0m} \ldots a_{01}$, with $a_{0m+2} = a_{0k}$ as a sign bit; $a_1 = (a_{1m+2})a_{1m+1}a_{1m} \ldots a_{11}$, with $a_{1m+2} = a_{1n}$ as a sign bit. Therefore, $c = \pm a_0 \pm a_1 = (c_{m+2})c_{m+1}c_m \ldots c_1$. Next the integer c can be reduced to a compact form. In making an adder-subtractor, assume that m=q $(q \geq 2)$ is constant for all integers. That is, assume that input integers $a_0$ and $a_1$ are in an extended form.

Accordingly, given two input binary integers $a_0$ and $a_1$ having following representations:

$a_o = (a_{0q})a_{0q-1} \ldots a_{01}$, $(a_{0q})$ is a sign bit, $(q \geq 2);$ $a_1 = (a_{1q})a_{1q-1} \ldots a_{11}$, $(a_{1q})$ is a sign bit, and an input sign at each of the integers in an expression $^c s_0 s_1 = \pm a_0 \pm a_1$, the output result is $^c s_0 s_1 = (c_{q+2})c_{q+1}c_q \ldots c_1$.

Another way of stating the forgoing is as follows:

$$c_{s_0s_1}=\pm a_0\pm a_1=\pm(a_{0q})a_{0q}a_{0q}a_{0q-1} \ldots a_{01}\pm(a_{1q})a_{1q}a_{1q}a_{1q-1} \ldots a_{11}.$$

The result $c_{s_0s_1}$ is given as shown in Example 6.

EXAMPLE 6

| If bits | $C_{q+2}$ | $C_{q+1}$ | $C_q$ | then integer c is |
|---------|-----------|-----------|-------|-------------------|
|         | 0         | 0         | 0     | positive in range |
|         | 0         | 0         | 1     | positive overflow |
|         | 0         | 1         | 0     | positive overflow |
|         | 1         | 1         | 0     | negative underflow |
|         | 1         | 1         | 1     | negative in range. |

The result $c_{s_0s_1}$ is completely correct, but as with machines in the known prior art, sometimes there are too many digits produced from the computing (i.e., there is positive overflow or negative underflow in a machine doing the computing).

As shown in Example 6, if $c_{q+1}$ and $c_q$ are different, then the integer c is out of the range of the adder-subtractor. The range is as follows:
$-(2^{q-1})\leq a_0, a_1 \leq (2^{q-1})-1$ in a decimal system,
$(1_q)0_{q-1} \ldots 0_1 \leq a_0, a_1 \leq (0_q)1_{q-1} \ldots 1_1$ in a binary system,
$-2^q \leq c \leq 2^q$ in a decimal system,
$(1_{q+1})0_q \ldots 0_1 \leq c \leq (0_{q+2})1_{q+1}0_q \ldots 0_1$ in a binary system.

Turning from the handling of all digits to the handling of a j digit, FIG. 1 is a diagram of an adder-subtractor device 2 according to the present invention. The adder-subtractor device 2 includes a jth device 4 for each bit position j for computing a result for an expression $\pm a_0 \pm a_1$, where $a_0$ and $a_1$ are binary numbers. The jth device 4 is from a group of devices, the group being defined by formulas (set forth below) using integer parameters k, $p_0$, $p_1$, t, $x_0$, $x_1$, $y_0$, and $y_1$, each said parameter having a nonnegative integer value that is less than two. That is, each said parameter has a value of 0 or 1.

Each jth device 4 includes a line 6 carrying an input $s_0$ representing $x_0$ if the sign at the $a_0$ number in the expression is positive, and representing $1-x_0$ if the sign at the $a_0$ number in the expression is negative. The jth device 4 also includes a line 8 carrying an input $a_{0j}$ representing a jth digit of the $a_0$ number. Further, the jth device 4 includes a line 10 carrying an input $s_1$ representing $x_1$ if the sign at the $a_1$ number in the expression is positive, and representing $1-x_1$ if the sign at the $a_1$ number in the expression is negative. Additionally, the jth device 4 includes a line 12 carrying an input $a_{1j}$ representing a jth digit of the $a_1$ number.

The jth device 4 further includes a line 14 carrying an input $w_{0j}=1-y_0$ if $s_0=1-x_0$ and if a previous bit position of the $a_0$ number is 1, and $w_{0j}=y_0$ if $s_0=1-x_0$ and there is no 1 on a previous bit position. The jth device further includes a line 16 carrying an input $w_{1j}=1-y_1$ if $s_1=1-x_1$ and if a previous bit position of the $a_1$ number is 1, and $w_{1j}=y_1$ if $s_1=1-x_1$ and if there is no 1 on a previous bit position.

In any case, the jth device 4 also includes at least one line 18 carrying a forward input $F_{in}$; at least one line 20 carrying a forward output $F_{out}$; and a line 22 carrying an output $c_j$ representing a jth digit of the result from computing the expression $\pm a_0 \pm a_1$.

Also in any case, between the previously mentioned lines, the jth device includes a plurality of switches 24 connected for directing the forward input $F_{in}$ to the output $c_j$ such that the output is according to one of the formulas:

$$c_j = (1-p_0)(s_0 \oplus x_0)(w_{0j} \oplus y_0) \oplus a_{0j} \oplus (1-p_1)(s_1 \oplus x_1)$$

$$(w_{1j} \oplus y_1) \oplus a_{1j} \oplus (1-(s_k \oplus x_k)p_k)(s_{1-k} \oplus x_{1-k})p_{1-k} \oplus t \oplus F_{in}$$

$$\oplus p_0 \cdot p_1 (s_0 \oplus x_0)(s_1 \oplus x_1)((w_{0j} \oplus y_0) \oplus (w_{1j} \oplus y_1) \oplus (w_{0j} \oplus y_0)(w_{1j} \oplus y_1)),$$

the plurality of switches 24 also for directing a bit value to the forward output $F_{out}$, according to another of said formulas:

$$F_{out}=(1-p_k)(s_k \oplus x_k)(w_{kj} \oplus y_k) \oplus a_{kj} \oplus t$$

if $$p_0(s_0 \oplus x_0) \oplus (1-p_0)(s_0 \oplus x_0)(w_{0j} \oplus y_0) \oplus a_{0j}=p_1(s_1 \oplus x_1) \oplus (1-p_1)(s_1 \oplus x_1)(w_{1j} \oplus y_1) \oplus a_{1j}.$$

By inserting different values of $p_0$, $p_1$, $x_0$, $y_0$, k, and t into the foregoing formulas, the formulas can be simplified to specify the switching required to implement a physical realization of the invention.

Note that this configuration of the invention processes bits as 0's and 1's. It would be completely equivalent to replace the 0's and 1's with the opposite digital value, and this alternative configuration is within the scope of the present invention.

Optionally (but illustrated in FIG. 1), the adder-subtractor 2 can have said plurality of switches 24 directing the forward input $F_{in}$ to the forward output $F_{out}$ if there is the following inequality:

$$p_0(s_0 \oplus x_0) \oplus (1-p_0)(s_0 \oplus x_0)(w_{0j} \oplus y_0) \oplus a_{0j} \neq p_1(s_1 \oplus x_1) \oplus (1-p_1)(s_1 \oplus x_1)(w_{1j} \oplus y_1) \oplus a_{1j}.$$

Figure 11:
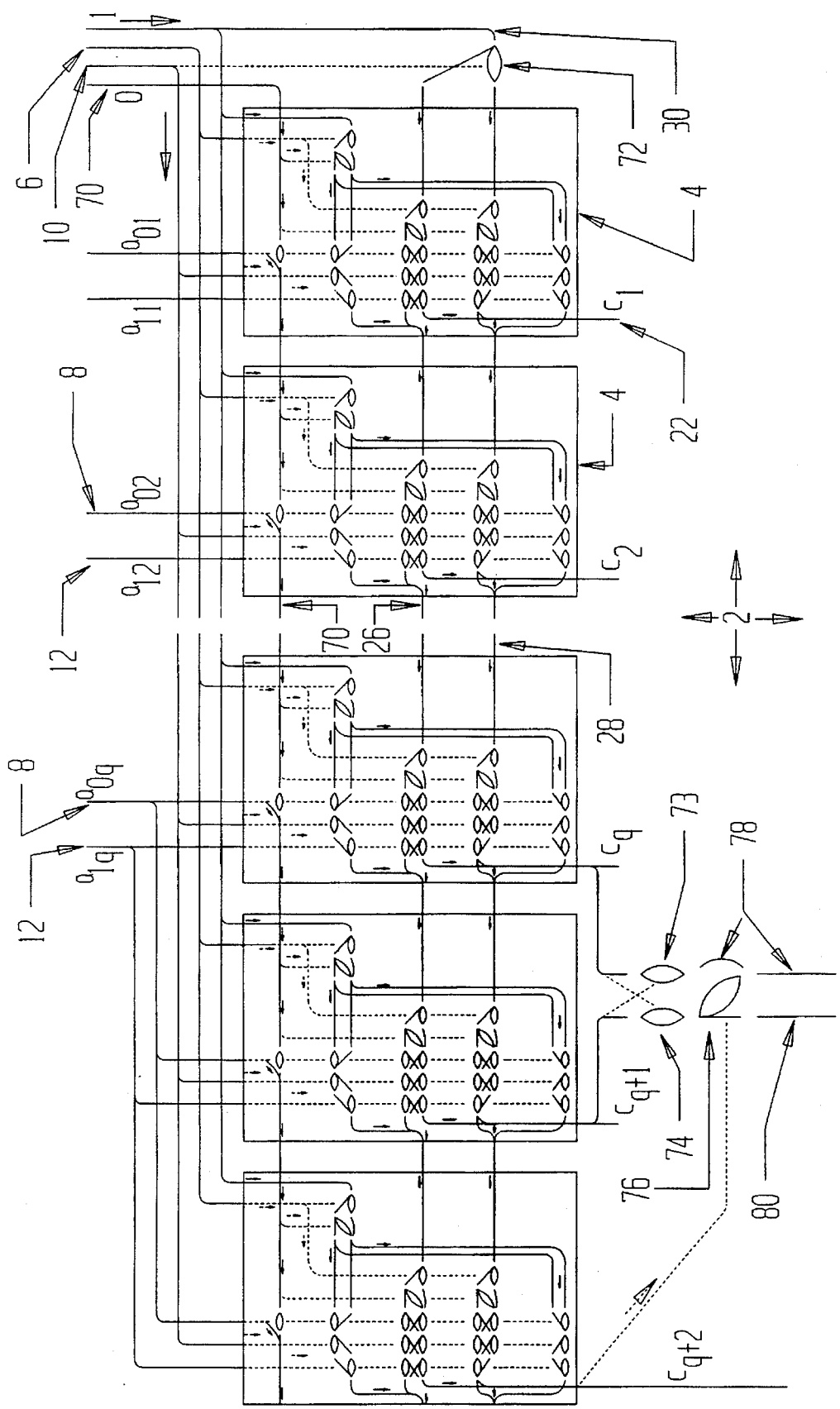
FIG. 11 is a diagram of the species of the device diagramed in FIG. 10 in a configuration for handling multiple digits.
Figure 13:
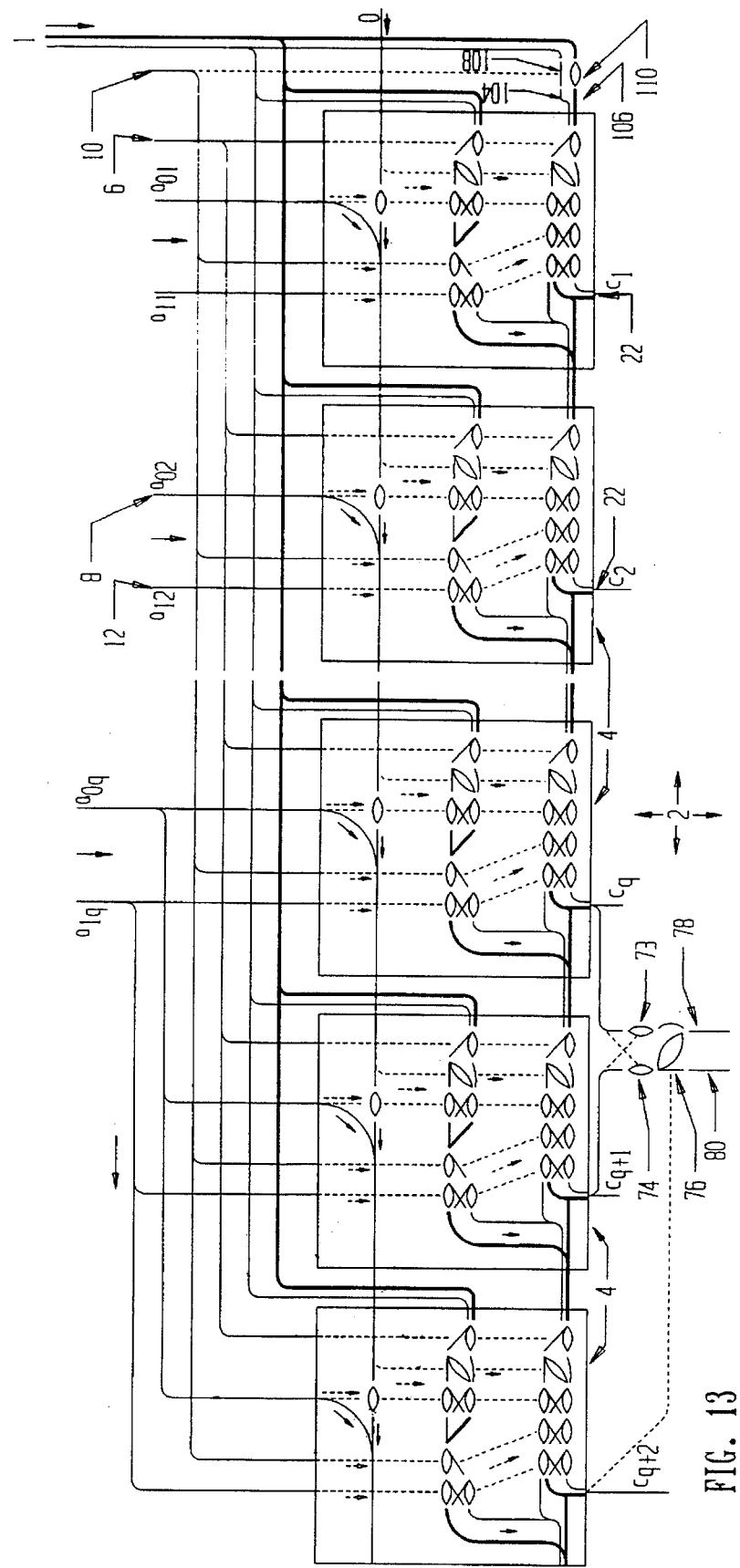
FIG. 13 is a diagram of the alternative embodiment of the species diagramed in FIG. 12 in a configuration for handling multiple digits.

(This feature is optional because more complicated circuits can be designed to skip the middle circuit blocks illustrated in FIG. 11 and FIG. 13.)

In making an adder-subtractor according to the present invention, a wide range of switching configurations can be used, though for speed, it is preferable to select switching that permits an addition-subtraction operation to be conducted with one clock cycle. Switches can be set on the leading edge of a clock cycle, and signal representing the addition-subtraction values can be sent through the set switches on the trailing edge of the clock cycle. Accordingly, a result c for the integer expression $c=\pm a_0 \pm a_1$ can be computed in one clock cycle.

Figure 2:
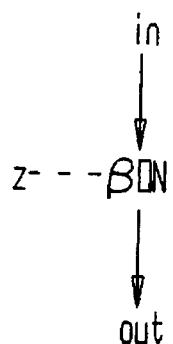
FIG. 2 is a diagram of a βON switch.

With regard to the plurality of switches 4, consider the various kinds of switches that are separately known in the art. The basic properties of two kinds of switches (a 0ON switch and a 1ON switch) can be generalized as illustrated in FIG. 2 with a βON switch. β is a parameter with one of two values (β=0 or 1) that identify one of the two kinds of switches discussed below. For either kind of switch, there is an input (incoming signal) and a second input (incoming signal), and an output (outgoing signal). The second input can be designated as a control variable z, which is a binary (two-valued) control variable because it controls the ON/OFF setting of the switch. The values of the control variable z can be z=0 or 1, as illustrated in FIG. 2.

The output of a βON switch is 1 if, and only if, the input is 1 and a control variable z (which regulates the setting of the βON switch) equals β. As mentioned, FIG. 2 generalizes the two kinds of switches because regardless of whether β=0 or 1, the output=1 if the input=1 and if $z=\beta$; otherwise, the output=0. The properties of $\beta ON$ in FIG. 2 can also be stated as follows: if $z=\beta$ the output=input, and if $z \neq \beta$ then output= 0; if the control variable $z=\beta$ then switch $\beta ON$ is ON; if $z \neq \beta$ then switch $\beta ON$ if OFF.

Figure 3:
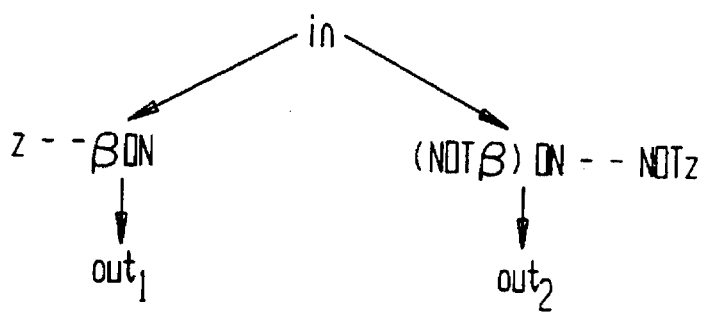
FIG. 3 is a diagram of 0ON and 1ON switches.

FIG. 3 is an illustration of 0ON and 1ON switches. That is, with $\beta=0$ or 1 (from FIG. 2), the two kinds of switches can be represented as $\beta ON$ and $(NOT\beta)ON$. Each of the two kinds of switches can be used in a configuration with the same input, but with different bit values for the respective control variables for each kind of switch. A 0ON switch and a 1ON switch are equivalent if the control variables have different values, as shown in FIG. 3. In some cases, it is better to use one or the other, for example, in a particular application where it is easier to handle the opposite value of the control variable.

With further regard to FIG. 3, the output of a 0ON switch and a 1ON switch can be described as follows: $out_1=1$ if in=1 and $z=\beta$, and otherwise $out_1=0$; $out_2=1$ if in=1 and $NOTz=NOT\beta$, and otherwise $out_2=0$. Therefore, $out_1=out_2$, which again implies that each kind of switch can replace the other when control variable z is replaced with NOTz.

FIGS. 4-9 show switches illustrated by graphic symbols: a 0ON switch is represented by a graphic symbol ( ) and a 1ON switch is represented by any one of the following graphic symbols \, |, /. FIGS. 4-9 also illustrate how 0ON and 1ON switches can be used to make $\Lambda$, V, and 0X0 switches.

Figure 4:
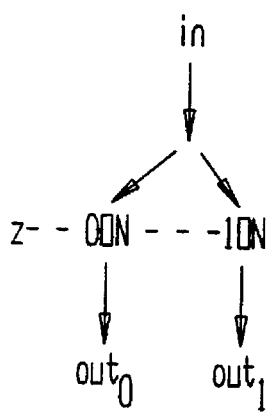
FIG. 4 is a diagram of an Λ switch.
Figure 5:
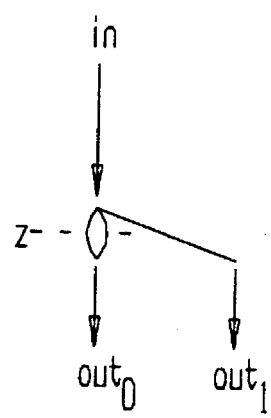
FIG. 5 is another diagram of an Λ switch.

Referring now to FIGS. 4-5, a diagram of a $\Lambda$ switch is provided. (The only difference between FIG. 4 and FIG. 5 is that alternative symbols are used.) a $\Lambda$ switch is defined as a switch with a first input (in), a second input (i.e., a control variable z), and two outputs ($out_0$ and $out_1$) such that the first input is directed to one of the two outputs depending on the value of the control variable z that selects one of the two outputs. Said another way, the $\Lambda$ switch can be characterized as follows: $out_z=in$, $out_{NOTz}=0$. Accordingly, for $z=0$ or 1, $out_z=in$, and $out_{NOTz}=0$, as illustrated in FIGS. 4-5.

Turning now to FIGS. 6-7, a diagram of a V switch is provided. (Again, the only difference between FIG. 6 and FIG. 7 is that alternative symbols are used.) A V switch is defined as a switch with two inputs ($in_0$ and $in_1$), a third input (i.e., a control variable z), and one output (out) such that one of the two inputs ($in_0$ or $in_1$) is selected depending on the value of the control variable z, which selects on of the two inputs. Accordingly, for $z=0$ or 1, $out=in_z$, as illustrated in FIGS. 6-7.

Regarding FIG. 8 is a diagram of a 0X0 switch. FIG. 9 provides an equivalent switching operation by using a $\Lambda$ switch. An 0X0 switch is defined as a switch with two inputs ($in_0$ and $in_1$), a third input (i.e., a control variable z), and two outputs ($out_0$ and $out_1$) such that the two inputs ($in_0$ and $in_1$) are each passed straight through or inverted depending on the value of the control variable z. FIGS. 8-9, for $z=0$ or 1, illustrate the 0X0 and its equivalent, respectively. Another way of understanding a 0X0 switch is with reference to the following:

$$out_{k'} = \begin{cases} in_{k'} & \text{if } z = 0; \\ in_{NOTk'} & \text{otherwise}, \quad (k' = 0, 1). \end{cases}$$

In connection with the present invention, any kind of switch can be used, including electric, optic, electromagnetic, mechanical, hydraulic, and/or pneumatic switches. Further, the signals in and out, as well as the control variables, can be electromagnetic waves (particularly light), mechanical, and hydraulic and/or pneumatic signals, depending on the embodiment of the switch preferred. In any of these approaches, the switch is a "real world" device implementing transformations described by the above-given formulas.

For speed, it is best to keep the amount of time for switching as small as possible and to keep the time for passing an incoming signal through the switches as short as possible. From this point of view, optical switching is preferred, and optical switches are well known. A representative example of an optical switch is discussed in Hyatt M. Gibbs, Optical Bistability: Controlling Light with Light, Academic Press, Inc. 1985, page 216[5.5]. The optical switch uses one light beam to control whether another light beam passes through the switch. With such a device, the control variable z is a light beam, and if switching beam is absent z=0; if switching beam is present z=1.

Another representative example is mentioned in J. Wilson, J. F. B. Hawkes, Optoelectronics, Prentice Hall, Second edition, 1989, page 95. The example involves switching a light beam with applied voltage. This example uses a Pockels cell modulator and a birefrigent material. A light beam input to the Pockels cell modulator and passed on to the birefrigent material is switched from a first output position to a second output position by applying a voltage changed from zero to $V_p$ to the birefrigent material. The applied voltage is the control variable.

Mechanical, hydraulic, and pneumatic switches are also well known and described in the literature.

First Species: $k=p_1=1$, $t=x_0=x_1=y_0=y_1=p_0=0$

Figure 10:
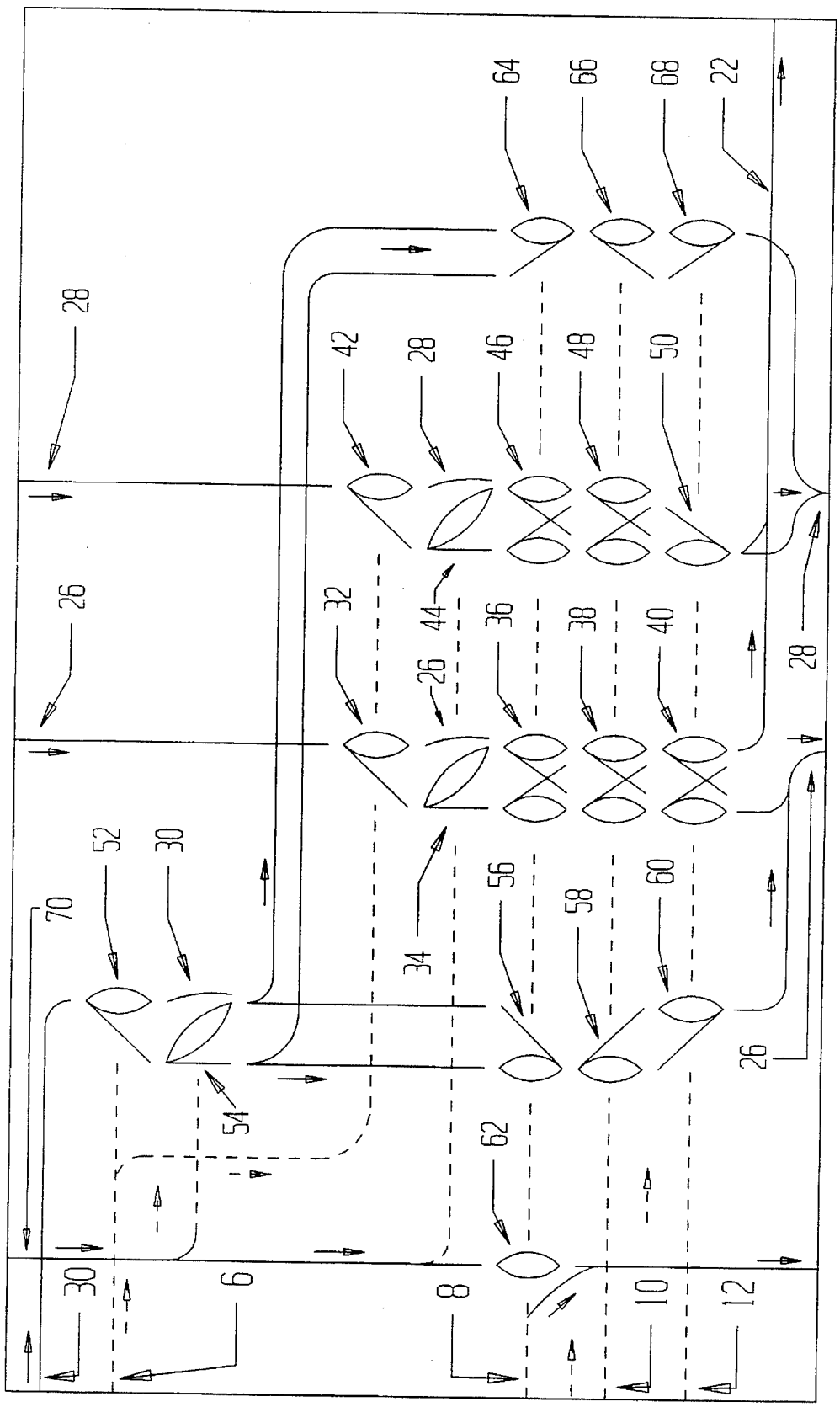
FIG. 10 is a diagram of a species of the device diagramed in FIG. 1.

Turning now to FIG. 10, a diagram of a species of the device diagramed in FIG. 1 is provided. In FIG. 10 the broken lines delineate two-valued control variables.

In this particular species, integer parameters for the formulas are as follows:

$$k=p_1=1, p_0=t=x_0=x_1=y_0=y_1=0.$$

Accordingly, one of the foregoing formulas simplifies, for example, as follows:

$$c_j = (1 - p_0)(s_0 \oplus x_0)(w_0 \oplus y_0) \oplus a_{0j} \oplus (1 - p_1)(s_1 \oplus x_1)$$

$$(w_{1j} \oplus y_1) \oplus a_{1j} \oplus (1 - (s_k \oplus x_k)p_k)(s_{1-k} \oplus x_{1-k})p_{1-k} \oplus t \oplus F_{in}$$

$$\oplus p_0 \cdot p_1(s_0 \oplus x_0)(s_1 \oplus x_1)((w_{0j} \oplus y_0) \oplus (w_{1j} \oplus y_1) \oplus (w_{0j} \oplus y_0)(w_{1j} \oplus y_1)),$$

$$c_j = (1 - 0)(s_0 \oplus 0)(w_{0j} \oplus 0) \oplus a_{0j} \oplus (1 - 1)(s_1 \oplus 0)(w_{1j} \oplus 0)$$

$$\oplus a_{1j} \oplus (1 - s_1)p_0 \cdot s_0 \oplus p_0 \cdot p_1$$

$$(s_0 \oplus 0)(s_1 \oplus 0)((w_{0j} \oplus 0) \oplus (w_{1j} \oplus 0) \oplus (w_{0j} \oplus 0)(w_{1j} \oplus 0)) \oplus 0 \oplus F_{in};$$

$$c_j = s_0 \cdot w_{0j} \oplus a_{0j} \oplus a_{1j} \oplus F_{in}.$$

Additionally, for this species the other of the foregoing formulas can be simplified, for example, as follows:

$$F_{out} = (1 - p_k)(s_k \oplus x_k)(w_{kj} \oplus y_k) \oplus a_{kj} \oplus t$$

if $$p_0(s_0 \oplus x_0) \oplus (1 - p_0)(s_0 \oplus x_0)(w_{0j} \oplus y_0) \oplus a_{0j} = p_1(s_1 \oplus x_1) \oplus (1 - p_1)(s_1 \oplus x_1)(w_{1j} \oplus y_1) \oplus a_{1j}.$$

$$F_{out} = (1 - p_1)(s_1 \oplus x_1)(w_{1j} \oplus y_1) \oplus a_{1j} \oplus 0;$$

$$F_{out} = a_{1j}$$

if $$s_0 \cdot w_{0j} \oplus a_{0j} = s_1 \oplus a_{1j}.$$

Accordingly, for this species the following approach can be implemented:

$F_{out} = F_{in}$ if $p_0(s_0 \oplus x_0) \oplus (1-p_0)(s_0 \oplus x_0)(w_0 \oplus y_0) \oplus a_{0j} \neq p_1(s_1 \oplus x_1) \oplus (1-p_1)(s_1 \oplus x_1)(w_1 \oplus y_1) \oplus a_{1j};$ $F_{out} \neq F_{in}$ if $s_0 \cdot w_{0j} \oplus a_{0j} \neq s_1 \oplus a_{1j}.$ FIG. 10 illustrates an embodiment implementing the simplified mathematics for this one species of the genus illustrated in FIG. 1. FIG. 10 can be made, for example, with the switches illustrated in FIGS. 2–9. Line 26 with an input signal connects to Λ switch 32, and if a control variable at switch 32 is zero, the signal on the line 26 is passed on, as represented in FIG. 10 by arc 26. If the control variable at switch 32 is 1, output from the switch 32 is applied as an input to Λ switch 34. Outputs from the switch 34 are fed as inputs to 0X0 switch 36. Outputs from the switch 36 are fed as inputs to 0X0 switch 38. The outputs from the switch 38 are fed as inputs to 0X0 switch 40. One output from switch 40 is fed to line 22, and another output from the switch 40 is fed to line 26. If a control variable at switch 32 is 0, the output from the switch 32 is passed to the switch 36 (i.e., the switch 34 is bypassed). In this configuration, if the respective control variables are 1, 1, 0, 0, and 0 at the switches 32, 34, 36, 38, and 40, the input signal passes on the line 26. When the respective control variables are 0, 0, 0, and 0 at the switches 32, 36, 38, and 40, the input signal from the line 26 passes to the line 22.

Line 28 connects to Λ switch 42, and if a control variable at the switch 42 is 0, a signal on line 28 is passes on, as represented in FIG. 10 by an arc 28. If the control variable at the switch 42 is 1, output from the switch 42 is applied as an input to Λ switch 44. Outputs from the switch 44 are fed as inputs to 0X0 switch 46. Outputs from the switch 46 are fed as inputs to 0X0 switch 48. Outputs from the switch 48 are fed as inputs to V switch 50. Output from the switch 50 is split to pass the signal to the line 22 and to pass the signal on the line 28.

If a control variable at switch 42 is 0, the output from the switch 42 is passed to the switch 46 (i.e., the switch 44 is bypassed).

Line 30, which conducts a value of 1, connects to Λ switch 52. If a control variable at the switch 52 is 0, the value of 1 on the line 30 is passed on, as represented in FIG. 10 by an arc, and is split to provide an input to V switch 56 and an input to V switch 64. If the value of a control variable at the switch 52 is 1, the output from switch 52 is applied as an input to Λ switch 54. Two outputs from the switch 54 are each split so that both are fed as inputs to the switch 56 and as inputs to the V switch 64. Output from the switch 56 is applied as an input to Λ switch 58. Outputs from the switch 58 are fed as inputs to a V switch 60. If respective control variables at switches 52 and 56 are 0 and 1, a value of 1 is input to the switch 58. If respective control variables are 1, 1, and 0 at switches 52, 54, and 56, respectively, a value 1 is input to the switch 58. Further, if the control variable for the switch 58 is different from the control variable for the switch 60, the output from the switch 56 is passed on to the line 26.

Output from the switch 64 is input to a Λ switch 66. If respective control variables are 0 and 0 at the switches 52 and 64, a value of 1 is input to the switch 66. If respective control variables are 1, 1, and 1 at the switches 52, 54, and 64, and a value of 1 is input to the switch 66. Two outputs from the switch 66 are fed as inputs to V switch 68. Output from the switch 64 is passed on to line 28 if the control variable for switch 66 is equal to the control variable for the switch 68.

Line 70 in FIG. 10 (which is also shown in FIG. 11) can connect to 0ON switch 62, which is optional, depending on the embodiment. That is, if the line 70 inputs a 0 value, output from the circuit in FIG. 10 on the line 70 will be the value input on line 8, etc. However, if the circuit is an optical embodiment, two 1 values input on both lines 8 and 70 could cause interference, such that the use of switch 62 would be a better embodiment. Alternatively, the switch 62 can be located on the line 8. In any case, the line 8 carries a signal representing the value of $a_{0j}$, and the line 70 carries a signal representing the maximal value of all $a_{0j}$'s from previous positions the same value as that carried on line 14 or 16, depending on the value of the parameters $x_0$ and $y_0$. As shown in FIG. 10, the control variable signals for the switches 34 and 44, as well as switch 54, are tapped from the line 70.

The switches 52, 32, and 42 are controlled by the control variable signals on the line 6 as the value for $s_0$.

The switches 62, 56, 36, 46, and 64 are controlled by the signals $a_{0j}$ tapped from line 8.

The switches 58, 38, 48, and 66 are controlled by the signals input on the line 10 as the value for $s_1$.

The switches 60, 40, 50, and 68 are controlled by the signals input on the line 12 as the value for $a_{1j}$.

The jth device 4 circuit block in FIG. 10 can be incorporated into the circuit diagram as illustrated in FIG. 11. Additionally, there is a Λ switch 72, which directs a value 1 on the line 30 to either the line 28 or the line 26, such that if the value of $s_1$ on line 10 is 0, then the value of 1 is directed to the line 28 in the sequentially first circuit block of FIG. 10. But if the value of $s_1$ is 1, then the value of 1 is directed to the line 26 in the first circuit block of FIG. 10, as illustrated in FIG. 11.

Further, optionally, there is a value of 0 on the line 70 supplied as an optional input in the first circuit block of FIG. 10 if in a particular embodiment it is necessary to precisely define $a_{00}=0$.

FIG. 11 also shows a representative plurality of switches for controlling, for output $^c s_0 s_1 = (c_{q+2})(c_{q+1} c_q \ldots c_1$ that is outside or inside the range of the last group of circuit blocks 11 that perform an adder-subtractor computation. There is a 0ON switch 73, which is controlled by a control variable $c_{q+1}$, and a 0ON switch 74, which is controlled by a control variable $c_q$. This is, output $c_q$ is an input to a switch 73, output $c_{q+1}$ is an input to a switch 74. Output from switch 74 is fed into a Λ switch 76, which is controlled by a control variable $c_{q+2}$. Output from the switch 73 passes through to line 78. If $c_{q+2}$ has a value of 1, then output from the switch 76 is directed to line 80. If $c_{q+2}$ has a value of 0, then output from the switch 76 is directed to the line 78. Accordingly, if the value on the line 78 is 1, then the number c is over the range, i.e., there is "overflow." If the value on line 80 is 1, then the number c is under the range, i.e., there is "underflow." If the values are 0 on both the lines 80 and 78, then the result is in the range, i.e., there is no "overflow" or "underflow." (See Example 6.)

In FIG. 11, depending on the values of the control variables $s_0$, $s_1$, $a_{0j}$, $a_{1j}$, and $w_{0j}$ the switches form different paths or end the paths for these incoming signals. FIG. 11 shows an order of transferred bits.

Second Embodiment of the First Species

Figure 12:
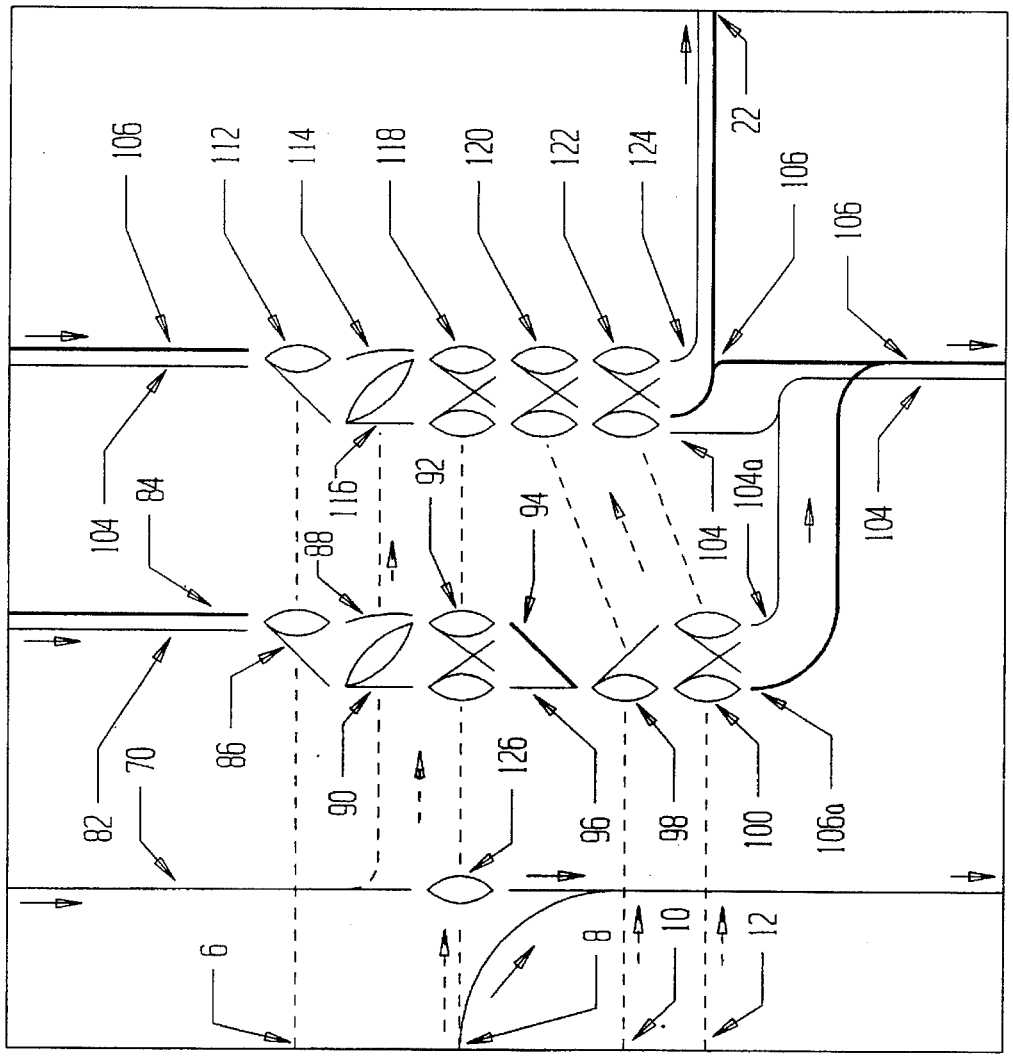
FIG. 12 is a diagram of an alternative embodiment of the species diagramed in FIG. 10.

Another embodiment of the same species (i.e., the parameters $k=p_1=1$, $p_0=t=x_0=x_1=y_0=y_1=0$ is illustrated in FIG. 12 (a block) and FIG. 13 (which uses the FIG. 12 block). Turning first to FIG. 12, there are thick and thin lines shown: compare thin line 82 with thick line 84; compare thin line 104 with thick line 106. The thin lines represent conducting a "thin" bit and the thick lines represent conducting a "thick" bit. In FIG. 12, the lines 82 and 84 carry bits each with a value of 1. On the lines 104 or 106, at switch 112 a bit value of 1 is carried. The thick/thin distinction is used to illustrate how in some embodiments, bits can be conducted in the same media but with different physical characteristics of the media, such as different polarization, different color of light, or plus/minus voltage. Even the same line can be used to convey the different characteristics of the media.

The lines 82 and 84 are inputs (so that the bit signals combine in a mix) at a Λ switch 86. If a control variable signal $s_0$ on the line 6 has a value of 0, the bit signals on lines 82 and 84 are passed on (via optional line 88) to an 0X0 switch 92. Thus, if the control variable signal $s_0$ on the line 6 is 0 and $a_{0j}$ on the line 8 has a value of 0, then the mix is supplied to line 94 in a way that only the thick bit is conveyed, e.g., by filtering out the thin bit signal. But when $s_0$ on the line 6 has a value of 1, the mix is input to Λ switch 90. Outputs from the switch 90 are inputs to the switch 92 in a manner that if $s_0$ on line 6 has a value of 1, the control variable on the line 70 has a value of 1, and the control variable on the line 8 has a value of 0, then the mix is supplied to line 96. Line 96 conveys only a thin bit, e.g., again by means of a filter or the like to remove the thick bit.

A switch 98 is therefore supplied with either the thin or the thick line bit signals. Outputs of switch 98 are input to 0X0 switch 100 such that if the control variable $s_1$ on the line 10 has a value of 1, and control variable $a_{1j}$ on the line 12 has a value of 0, a signal is supplied to line 104a, which conveys only a thin bit (again via filtering). Alternatively, if the control variable $s_1$ on the line 10 has a value of 0, and the control variable $a_{1j}$ on the line 12 has a value of 0, then a signal is supplied to line 106a, which conveys only a thick bit (e.g., again via filtering).

The line 104a connects to the line 104 so that the signal supplied to the line 104 can be passed on to a next block, etc., as illustrated in FIG. 13. Similarly, line 106a is connected to line 106, etc.

In FIG. 13, if the control variable $s_1=1$ at 1ON switch 108 then thin line 104 conducts thin bit 1, and thin bit 1 is fed to Λ switch 112, in the sequentially first circuit block of FIG. 12 used in FIG. 13. When a control variable $s_1=0$ at 0ON switch 110 then thick line 106 conducts thick bit 1, and thick bit 1 is also an input to the Λ switch 112 in the first circuit block of FIG. 12 used in FIG. 13.

In FIG. 12, if the control variable $s_0=0$ at the switch 112, then bit 1 (either a thin or thick bit 1) passes on line 114 as an input to an 0X0 switch 118. (Line 114 is optional because output from the switch 112 can be passed directly to the switch 118 in some embodiments, as discussed with reference to the line 26 and the line 28 in FIG. 10.) If the control variable $s_0=1$ at the 112, both the thin and the thick bits, each having a value of 1, are input to Λ switch 116.

Outputs from the switch 116 are fed as inputs to an 0X0 switch 118. Outputs from the switch 118 are fed as inputs to an 0X0 switch 120. Outputs from the switch 120 are fed as inputs to an 0X0 switch 122. A "first" output signal from the switch 122 is split into two portions, with one portion passing to thin line 104 (e.g., via a filter) and an other portion passing to thick line 106 (e.g., via a filter). From the line 106 there is a connection to pass output to the line 22; when the line 106 carries a thick bit value of 1 to the line 22, then the digit $c_j=1$. A "second" output signal from the switch 122 passes to the thin line 124 (again, via a filter, for example) which is connected to the line 22; when the line 124 carries a thin bit value of 1 to the line 22, then the digit $c_j=1$. But if the line 124 does not carry the thin bit value of 1 and also the line 106 does not carry the thick bit value of 1, then the digit $c_j=0$.

In this embodiment, if the respective control variables are 0, 0, 0, and 0 at the switches 112, 118, 120, and 122, the input bit 1 to the switch 112 passes to the line 124. If the respective control variables are 1, 1, 0, 0, and 0 for the switches 112, 116, 118, 120, and 122, the input to the switch 112 passes to the lines 104 and 106. The lines 104 and 106 can be joined if design requirements for a particular embodiment make it preferable or necessary to pass output on one line.

The line 70 is as described above with regard to FIG. 10. The switches 86 and 112 are controlled by the control variable signals on the line 6 as the value for $s_0$. The switches 90 and 116 are controlled by the control variable signal on the line 70. The switches 126, 92, and 118 are controlled by the control variable on the line 8 as the value for $a_{0j}$. The switches 98 and 120 are controlled by the control variable on the line 10 as the value for $s_1$. The switches 100 and 122 are controlled by the control variable on the line 12 as the value for $a_{1j}$. In FIG. 12, certain switches can transfer both thick and thin kinds of bits having values of 1. FIGS. 12 and 13 show the order of transferring bits.

FIG. 12 is similar in many ways to FIG. 10. However, rather than using the FIG. 10 approach of than having one input on the line 30 carrying a 1 value, in FIG. 12 there is an input on the line 82 and an input on line 84, each of these inputs carrying a 1 value. Similarly, rather than using the FIG. 11 approach of using one switch 72, in FIG. 13 there are the two switches 108 and 110. FIG. 13 and FIG. 11 have analogous means for determining underflow and overflow.

Of course it is equally possible to make the other embodiments of this (and other) species of the invention, as well as equivalents, as illustrated below.

Third Embodiment of the First Species

For the input integers $a_0$ and $a_1$ which have following binary representations:

$a_0 = (a_{0q})a_{0q-1}\ldots a_{01}$,   $a_{0q}$ is a sign bit,   $(q \geq 2)$ $a_1 = (a_{1q})a_{1q-1}\ldots a_{11}$,   $a_{1q}$ is a sign bit, for determining the result $c=\pm a_0 \pm a_1$, a third embodiment involves defining a bit sequence $c=(c_{q+2})c_{q+1}c_q \ldots c_1$, with $c_{q+2}$ as an output sign bit, as described below. Treat $s=s_1$ for simplicity; recall that $s_1=0$ or 1.

"Zero" and "one" are represented by two row columns as shown in Example 7.

EXAMPLE 7

$$0 = \begin{vmatrix} 0 \\ 1 \end{vmatrix}, \quad 1 = \begin{vmatrix} 1 \\ 0 \end{vmatrix}$$

To avoid use of a NOT operator, which slows down computation, bit 1 is located in the first or second row exclusively, as shown in Example 6. Bit 0 is therefore also in first or second row, as is also shown in Example 7.

Extend to the left the number $a_0$ by repeating the $a_{0q}$ bit two times as follows:

$a_{0q+2}=a_{0q+1}=a_{0q}$.

Similarly, extend the number $a_1$ by repeating the $a_{1q}$ bit two times as follows:

$a_{1q+2}=a_{1q+1}=a_{1q}$.

A comparison of the respective digits can be conceptually understood from Example 8, in which the first row is denoted as the 0_row and the second row is denoted as the 1_row.

EXAMPLE 8

| 1 | 1 | 1 | 011000 | 0 | 1 | 0_row |
|---|---|---|--------|---|---|-------|
| 0 | 0 | 0 | 100111 | 1 | 0 | 1_row |
| $a_{1q+2}$ | $a_{1q+1}$ | $a_{1q}$ | ... | $a_{11}$ | 0 | |

On the top row of Example 7, in columns q+2, ..., 0 put the digits $a_{0q+2}a_{0q+1}a_{0q}$ ... $a_{01}$ and s (s=$s_1$ is put in the 0_column). Below, in the second row, put such bits which satisfy a rule that a 1 appears only once in each column. In the third row in Example 8, in columns q+2, ..., 0 put bits $a_{1q+2}a_{1q+1}a_{1q}$ ... $a_{11}0$.

In Example 8, in the first row in columns q+2, ..., 1 find the first digit from the right that is 1 (where there is no 1, then $a_0$ is 0). That is, if for some position p'(p'≧1) the digit $a_{0p'}=1$, and there is no previous position r'(p'-1>r'≧1) that $a_{0r'}=1$, then there are two cases. In the first case, if there is a plus sign at $a_0$ (that is, the expression is $c=+a_0 \pm a_1$), no bit changes are made in the first and second row for bit positions q+2, ..., p'+1. In the second case, if there is a minus sign at $a_0$ (that is, the expression is $c=-a_0 \pm a_1$), exchange (flip) bits from the first and second row for bit positions q+2, ..., p'+1.

In other words, if at $a_0$ there is a plus sign (i.e., $s_0=0$), there is no exchange of bits; if at $a_0$ there is a minus sign (i.e., $s_0=1$), there is one exchange or flip of the bits from the first row to the second row.

For a bit position j (j=q+2, ..., 1) along a row, let bit position i (j>i) be the closest column right of j where the bit from that i_column, s_row equals to $a_{1i}$. (Recall that s=$s_1$=0 or 1.) Thus, if j=1 then i=0.

To find the result $c=\pm a_0 \pm a_1$, for every bit in the sequence $c=(c_{q+2})c_{q+1}c_q$ ... $c_1$, with each bit position j (j=q+2, ... 1), the plurality of switches 24 can implement the following:

$$c_j = \begin{cases} \text{i\_column 0\_row bit if } j\text{\_column } s\text{\_row bit equals to } a_{1j}; \\ \text{i\_column 1\_row bit, otherwise.} \end{cases}$$

Fourth Embodiment of the First Species

For the input integers $a_0$ and $a_1$ which have following binary representations:

$a_o = (a_{0q})a_{0q-1} \ldots a_{01}$,    $a_{0q}$ is a sign bit,    (q ≧ 2)

$a_1 = (a_{1q})a_{1q-1} \ldots a_{11}$,    $a_{1q}$ is a sign bit, for determining the result $^c s_0 s_1 = \pm a_0 \pm a_1$, a fourth embodiment involves determining the integer $c=\pm a_0 \pm a_1= \pm(a_{0q})a_{0q}a_{0q}a_{0q-1} \ldots a_{01} \pm (a_{1q})a_{1q}a_{1q}a_{1q-1} \ldots a_{11}=(c_{q+2})c_{q+1}c_q c_{q-1} \ldots c_1$.

Each of two possible cases are illustrated in Example 9 and Example 10, respectively, wherein the following symbols are used: A=NOTa, S=NOTs. If $s_0=0$ or if $a_0=0$, then the first row is denoted as 0_row and the second row is denoted as 1_row, with s=$s_1$. This is the same case as $c=a_0 \pm a_1$.

EXAMPLE 9

| column | | | | | | | | |
|---|---|---|---|---|---|---|---|---|
| q+2 | q+1 | q | q-1 | ... | p' | ... | 1 | 0 |
| $a_{0q}$ | $a_{0q}$ | $a_{01}$ | $a_{0q-1}$ | ... | $a_{0p'}$ | ... | $a_{01}$ | s | 0_row |
| $A_{0q}$ | $A_{0q}$ | $A_{0q}$ | $A_{0q-1}$ | ... | $A_{0p'}$ | ... | $A_{01}$ | S | 1_row |
| $a_{1q}$ | $a_{1q}$ | $a_{1q}$ | $a_{1q-1}$ | ... | $a_{1p'}$ | ... | $a_{11}$ | 0 | |

In the second case illustrated is in Example 10: if $s_0=1$ (which is the same as $c=-a_0 \pm a_1$), for some position p' (p'≧1) bit $a_{p'}=1$, there is no position r' (p'-1>r'≧1) that bit $a_{r'}=1$. Then in the first row, columns p', ..., 0 are labeled as 0_row, columns q+2, ..., p'+1 are labeled as 1_row; exchange (flip) the labels such that in the second row columns p', ..., 0 are labeled as 1_row, and columns q+2, ..., p'+1 are labeled as 0_row.

EXAMPLE 10

| | column | | | | | | | |
|---|---|---|---|---|---|---|---|---|
| | q+2 | ... | p'+1 | p' | p'-1 | ... | 1 | 0 |
| 1_row | $a_{0q}$ | ... | $a_{0p'+1}$ | 1 | 0 | ... | 0 | s | 0_row |
| 0_row | $A_{0q}$ | ... | $A_{0p'+1}$ | 0 | 1 | ... | 1 | S | 1_row |
| | $a_{1q}$ | ... | $a_{1p'+1}$ | $a_{1p'}$ | $a_{1p'-1}$ | ... | $a_{11}$ | 0 | |

In either of the previously-discussed two cases, to find the result $c=\pm a_0 \pm a_1$, for every bit in the sequence $c=(c_{q+2})c_{q+1}c_q$ ... $c_1$, with each bit position j (j=q+2, ..., 1), $c_j$ is as follows: For j (j=q+2, ..., 1) let bit position i (j>i≧0) be the closest to the right of j where i_column, s_row bit equals to $a_{1i}$. The plurality of switches 24 can implement switching such that $c_j$ is as follows:

$$c_j = i\text{\_column} \begin{cases} 0\text{\_row bit if } j\text{\_column } s\text{\_row bit equals to } a_{1j}; \\ 1\text{\_row bit, otherwise.} \end{cases}$$

Fifth Embodiment of the First Species

Another embodiment of the first species of the present invention can be made to minimize the use of the NOT operation. Again, for input integers $a_0$ and $a_1$ having the following binary representations:

$a_o = (a_{0q})a_{0q-1} \ldots a_{01}$,    $a_{0q}$ is a sign bit,    (q ≧ 2);

$a_1 = (a_{1q})a_{1q-1} \ldots a_{11}$,    $a_{1q}$ is a sign bit,    $a_{10}=0$.

output is again defined as $c=^C s_0 s_1 = \pm a_0 \pm a_1$, $c=(c_{q+2})c_{q+1}c_q$ ... $c_1$, where $c_{q+2}$ is a sign bit. Again, assuming that $a_{0q+2}=a_{0q+1}=a_{0q}$ and $a_{1q+2}=a_{1q+1}=a_{1q}$; treating s=$s_1$ simplicity; and recalling that $s_1=0$ or $1$, the following approach can be used.

Form a temporary second row of one's (the bits 1) at positions $q+2, \ldots, 0$ labeled with 1_row. Next, make a first 0_row (above the temporary second row) by shifting up bit 1 to the same positions as follows: if $s=1$ from the rightmost 0_position of the 1_row, shift up bit 1 to the 0_row; if $p' \geq 1$ is the smallest index that $a_{p'}=1$, then from the position $p'$ of the 1_row shift up bit 1 and from every position $r'(q+2 \geq r' \geq p'+1)$ of the 1_row if $a_{r'} \neq s_0$ shift up bit 1.

In the event that $s=0$, put bit 1 over the rows at every position $k'(q+2 \geq k' \geq 1)$ if $b_{k'}=1$, and label this sequence of one's with b_row; in the event that $s=1$, put a bit 1 below the rows at every position $k'(q+2 \geq k' \geq 1)$ if $b_{k'}=1$, and label this sequence of one's with b_row, the third row. In the fourth row, there is a result c_row at every position $n(q+2 \geq n \geq 1)$ there is bit 1 if $c_n=1$.

In every i_column $(q+2 \geq i \geq 0)$ if at both s_row and b_row either there are bits 1 or there is no bit 1 then in this i_column mark {darken} bit 1 which is in 0_row or 1_row.

The foregoing approach holds for one of the following two cases:
1) If a marked bit 1 is in the 0_row then in the result c_row bit 1 is in the next marked column (if exist), or
2) If a marked bit 1 is in the 1_row then in the result c_row bit 1 there is in the next {not marked} and every consecutive not marked column (if any exist).

In the result c_row remaining positions are zero's. As with the above-discussed species, this species is made by using the plurality of switches 24 to implement these cases.

Sixth Embodiment of the First Species

Once more, assume that the input integers $a_0$ and $a_1$ have following binary representations:

$$a_0 = (a_{0q})a_{0q-1} \ldots a_{01}, \quad a_{0q} \text{ is a sign bit}, \quad (q \geq 2);$$
$$a_1 = (a_{1q})a_{1q-1} \ldots a_{11}, \quad a_{1q} \text{ is a sign bit}.$$

Output integer $c = {}^c s_0 s_1 = \pm a_0 \pm a_1$, $c = (c_{q+2})c_{q+1}c_q \ldots c_1$. Assume: $a_{0q+2} = a_{0q+1} = a_{0q}$, $a_{1q+2} = a_{1q+1} = a_{1q}$, $a_{00} = s_1$ and $a_{10} = 0$. Put the digits $a_{0q+2}a_{0q+1}a_{0q} \ldots a_{01}a_{00}$ on the top row, below put row of digits $a_{1q+2}a_{1q+1}a_{1q} \ldots a_{11}a_{10}$.

Assume for a moment that parameter $p'=q+2$ and index $i_0=0$, but if $s_0=1$ and $t' \geq 1$ is a minimal index such that $a_{0t'}=1$ then let $p'=t'$. For an iterate index $j=0, 1, 2, \ldots$ find a minimal position $i_{j+1}$ $(p' \geq i_{j+1} > i_j \geq 0)$ where the following equalities hold:

$${}^a 0 i_{j+1} = NOT {}^a 0 i_j$$

and $${}^a 1 i_{j+1} = NOT {}^a 1 i_j.$$

If $s_0=1$ and $M \geq 0$ is a maximal index such that $i_M \leq p'$ $(p' \geq i_M)$ then fix a position $i_{M+1}$ $(i_{M+1} > p')$ that ${}^a 0 i_{M+1} = {}^a 0 i_M$ and ${}^a 1 i_{M+1} = NOT {}^a 1 i_M$; for an iterate index $r'=0, 1, 2, \ldots$ find a minimal position $i_{M+1+r'+1}$ $(q \geq i_{M+1+r'+1} > i_{M+1+r'})$ where the following equalities hold:

$${}^a 0 i_{M+1+r'+1} = NOT {}^a 0 i_{M+1+r'}$$

and $${}^a 1 i_{M+1+r'+1} = NOT {}^a 1 i_{M+1+r'}.$$

Columns 1 to $q+2$ can be separated into groups of consecutive columns. A first step of separation forms groups of columns between $i_j$ and $i_{j+1}$ (iterate $j \geq 1$, $j \neq M$ if $s_0=1$ and $i_M=p'$). Then there can be a second (i.e., conditional) step of separation to form additional groups of columns between $p'$ and $p'+1$ if $s_0=1$ and $p' > i_M$.

In each odd class (1st, 3rd, ...) of j columns a digit $c_j=1$ if $a_{0j} \neq a_{1j}$; in each even class (2nd, 4th, ...) of j columns a digit $c_j=1$ if $a_{0j}=a_{1j}$. All other bit positions have zero's. In using the present invention consider the following four examples for the sixth embodiment of the first species.

As a first example, consider $a_0=0$, $a_1=(1)010100$. The objective is to find a binary result for $c=a_0-a_1$. The solution is as follows: $s_0=0$, $s_1=1$, $q=7$, $p'=9$, $i_0=0$, $i_1=3$. A numeric illustration is shown below in Example 10.

EXAMPLE 10

```
         2nd  | 1st  0_column
a0 = 0 0 0 0 0 0 0 0 0    1
a1 = 1 1 1 0 1 0 1 0 0    0
         =    |  ≠
c  =         1   1 1 =   000101100,
c = (0)101100.
```

As a second example, consider $a_0=(1)0111000101$, $a_1=(0)11110010$. The objective is to find a binary result of $c=a_0+a_1$. The solution is as follows: $s_0=s_1=0$, $q=11$, $p'=13$, $i_1=7$, $i_2=9$. A numeric illustration is shown in Example 11.

EXAMPLE 11

```
a0 = 1 1 1 0 1 1 1 0 0 0 1 0 1    0
a1 = 0 0 0 0 0 1 1 1 1 0 0 1 0    0
      ≠   |  =  |   ≠
c  = 1 1 1 1   1   1 1   1 1 1 =  1111010110111,
c = (1)010110111.
```

Now for a third example, consider $a_0=(1)0100100$, $a_1=(0)1111010$. The objective is to find binary $c=-a_0+a_1$. The solution is a follows: $s_0=1$, $s_1=0$, $q=8$, $p'=3$, $M=0$, $(p' > i_M=0)$, $i_1=4$, $i_2=8$. A numeric illustration is provided in Example 12.

EXAMPLE 12

```
a0 = 1 1 1 0 1 0 0 1 0 0    0
a1 = 0 0 0 1 1 1 1 0 1 0    0
      =    | ≠   |=|   ≠
c  =       1 1   1 1    = 0011010110,
c = (0)11010110.
```

Finally, as a fourth example, consider $a_0=(0)101101000$, $a_1=(1)01010001$. Again, the objective is to find binary $c=-a_0-a_1$. The solution is as follows: $s_0=s_1=1$, $p'=4$, $i_1=1$, $i_2=4$, $M=2$, $(p'=i_M)$ $i_3=7$, $i_4=8$, $i_5=9$. A numeric illustration is provided in Example 13.

EXAMPLE 13

```
a0 = 0 0 0 1 0 1 1 0 1 0 0 0    1
a1 = 1 1 1 1 0 1 0 1 0 0 0 1    0
      ≠   |=|≠    =    |≠
c  = 1 1 1 1   1        1 1 1 = 111101000111,
c = (1)01000111.
```

Second Species, First Embodiment: $t=x_0=x_1=y_0=y_1=k=p_0=0$, $p_1=1$

For the general case of an adder-subtractor device for computing a result c for an expression $c = \pm a_0 \pm a_1$, the functioning of the adder-subtractor of the present invention can be better understood, and equivalent circuits can better be recognized, by focussing on the following ways to obtain $c_j$ on the line 22.

Again, two input integers $a_0$ and $a_1$ have following binary representations:

$a_o = (a_{0q})a_{0q-1} \ldots a_{01}$,  $(a_{0q})$ sign bit,  $(q \geq 2)$;

$a_1 = (a_{1q})a_{1q-1} \ldots a_{11}$,  $(a_{1q})$ sign bit.

Let $^c s_0 s_1 = \pm a_0 \pm a_1$.

The integers $a_0$ and $a_1$ can be placed into their extended forms to position $q+2$ {i.e., the two's complement in $(q+2)$ bits}:

$a_0 = (a_{0q+2})a_{0q+1}a_{0q} \ldots a_{01}$, $a_1 = (a_{1q+2})a_{1q+1}a_{1q} \ldots a_{11}$, where extended bits satisfy equalities: $a_{0q+2}=a_{0q+1}=a_{0q}$ and $a_{1q+2}=a_{1q+1}=a_{1q}$. For additional bits, let digits $a_{00}=a_{10}=0$.

The parameters $s_0$ and $s_1$ uniquely defined in the expression $^c s_0 s_1 = \pm a_0 \pm a_1$ by the signs at the integers. Let m be a bit position $(q+2 \geq m \geq 1)$, $k=0$ or 1; for integer $a_k$ and position m define parameter $w_{km}$ as follows: $w_{km}=1$ if there is a position p' $(m-1 \geq p' \geq 1)$ such that $a_{kp'}=1$; otherwise, $w_{km}=0$. In other words, $w_{km}$ equals to a maximal digit $a_{kk'}$ from previous positions k' $(k > k' \geq 0)$.

Accordingly, as illustrated in FIG. 12 and 13, the line 70 conveys the signal $w_{kj}$ for use in the plurality of switches 24 to compute the formulas:

$F_{out} = (1 - p_k)(s_k \oplus x_k)(w_{kj} \oplus y_k) \oplus a_{kj} \oplus t$  if $p_0(s_0 \oplus x_0) \oplus (1 - p_0)(s_0 \oplus x_0)(w_{0j} \oplus y_0) \oplus a_{0j} =$ $p_1(s_1 \oplus x_1) \oplus (1 - p_1)(s_1 \oplus x_1)(w_{1j} \oplus y_1) \oplus a_{1j}$;

and $c_j = (1 - p_0)(s_0 \oplus x_0)(w_{0j} \oplus y_0) \oplus a_{0j} \oplus (1 - p_1)(s_1 \oplus x_1)$ $(w_{1j} \oplus y_1) \oplus a_{1j} \oplus (1 - (s_k \oplus x_k)p_k)(s_{1-k} \oplus x_{1-k})p_{1-k} \oplus t \oplus F_{in}$ $\oplus p_0 \cdot p_1(s_0 \oplus x_0)(s_1 \oplus x_1)((w_{0j} \oplus y_0) \oplus (w_{1j} \oplus y_1) \oplus (w_{0j} \oplus y_0)(w_{1j} \oplus y_1))$.

The plurality of switches 24 directs the forward input $F_{in}$ to the forward output $F_{out}$ if $p_0(s_0 \oplus x_0) \oplus (1-p_0)(s_0 \oplus x_0)(w_{0j} \oplus y_0) \oplus a_{0j} \neq p_1(s_1 \oplus x_1) \oplus (1-p_1)(s_1 \oplus x_1)(w_{1j} \oplus y_1) \oplus a_{1j}$.

Assuming in above formulas that $p_0 = x_0 = x_1 = y_0 = y_1 = t = 0$, $p_1 = 1$ we get:

$F_{out} = (1-p_k)s_k \cdot w_{kj} \oplus a_{kj}$ if $s_0 \cdot w_{0j} \oplus a_{0j} = s_1 \oplus a_{1j}$;

$c_j = s_0 \cdot w_{0j} \oplus a_{0j} \oplus a_{1j} \oplus (1-s_k \cdot p_k)s_{1-k} \cdot p_{1-k} \oplus F_{in}$ The plurality of switches 24 directs the forward input $F_{in}$ to the forward output $F_{out}$ if $s_0 \cdot w_{0j} \oplus a_{0j} \neq s_1 \oplus a_{1j}$.

Thus, FIGS. 12 and 13 illustrate $k=0$. However, if $k=1$, similar circuits can be defined as follows: replace $a_{0j}$ with $a_{1j}$ and replace $s_0$ with $s_1$.

In a general case, fine (and mark or memorize) all r positions for $(q+2 \geq r \geq 0)$ where $s_0 \cdot w_{0j} \oplus a_{0j} = s_1 \oplus a_{1j}$; for any such r position identify a corresponding emit position. From emit r position send (emitted) is a bit $F_{out}$ named emit bit (ebit).

Any ebit value can be represented with any one of two different states of matter or energy, e.g., positive or negative voltage or magnetic polarity, light present or absent, etc.). Ebits are emitted from all emit positions; every ebit arrives at successive not marked positions up to the next marked position included in the computation (if such a position exists). The ebit induces one of the two different states. An ebit reaching a marked position induces the same ebit value state, but if the ebit reaches a not-marked position, a NOTebit (1-ebit, other state) state is induced. Thus, at position j $(q+2 \geq j \geq 1)$ a state's value induced by an arrived ebit equals $c_j$.

Second Species, Second Embodiment: $t = x_0 = x_1 = y_0 = y_1 = k = p_0 = 0, p_1 = 1$ The adder-subtractor device can also be mad by using $p_0 \cdot p_1 = t = 0$ and $k = p_0$, such that the plurality of switches, between the lines, for directing to the forward output $F_{out}$ the bit value, directs according to a simplified version of the one of said formulas, provided that if j=1 then $F_{in} = p_{1-k} \cdot s_{1-k}$:

$F_{out} = (1-p_k)(s_k \oplus x_k)(w_{kj} \oplus y_k) \oplus a_{kj}$ if $p_0(s_0 \oplus x_0) \oplus (1-p_0)(s_0 \oplus x_0)(w_{0j} \oplus y_0) \oplus a_{0j} = p_1(s_1 \oplus x_1) \oplus (1-p_1)(s_1 \oplus x_1)(w_{1j} \oplus y_1) \oplus a_{1j}$ and $F_{out} = F_{in}$ otherwise; and the plurality of switches, also for directing the forward input $F_{in}$ to the output $c_j$ such that the output is according to the other of said formulas directs according to a simplified version of the other of said formulas:

$c_j = F_{in}$ if $p_0(s_0 \oplus x_0) \oplus (1-p_0)(s_0 \oplus x_0)(w_{0j} \oplus y_0) \oplus a_{0j} = p_1(s_1 \oplus x_1) \oplus (1-p_1)(s_1 \oplus x_1)(w_{1j} \oplus y_1) \oplus a_{1j}$ and $c_j = 1 - F_{in}$ otherwise. In this situation, the formulii simplified by inserting the above-given integer values has been simplified to an equivalent by using mathematical identities.

Third Species: $p_0 = p_1 = 1$; $t = x_0 = x_1 = y_0 = y_1 = 0$

An adder-subtractor device for computing a result c for an expression $c = \pm a_0 \pm a_1$ with the above-mentioned formulas:

$F_{out} = (1-p_k)(s_k \oplus x_k)(w_{kj} \oplus y_k) \oplus a_{kj} \oplus t$ if $p_0(s_0 \oplus x_0) \oplus (1-p_0)(s_0 \oplus x_0)(w_{0j} \oplus y_0) \oplus a_{0j} =$ $p_1(s_1 \oplus x_1) \oplus (1-p_1)(s_1 \oplus x_1)(w_{1j} \oplus y_1) \oplus a_{1j}$;

$c_j = (1-p_0)(s_0 \oplus x_0)(w_{0j} \oplus y_0) \oplus a_{0j} \oplus (1-p_1)(s_1 \oplus x_1)$ $(w_{1j} \oplus y_1) \oplus a_{1j} \oplus (1 - (s_k \oplus x_k)p_k)(s_{1-k} \oplus x_{1-k})p_{1-k} \oplus t \oplus F_{in}$ $\oplus p_0 \cdot p_1(s_0 \oplus x_0)(s_1 \oplus x_1)((w_{0j} \oplus y_0) \oplus (w_{1j} \oplus y_1) \oplus (w_{0j} \oplus y_0)(w_{1j} \oplus y_1))$;

and the plurality of switches directs the forward input $F_{in}$ to the forward output $F_{out}$ if $p_0(s_0 \oplus x_0) \oplus (1-p_0)(s_0 \oplus x_0)(w_{0j} \oplus y_0) \oplus a_{0j} \neq p_1(s_1 \oplus x_1) \oplus (1-p_1)(s_1 \oplus x_1)(w_{1j} \oplus y_1) \oplus a_{1j}$.

The integer parameters inserted into the foregoing can be formulas to permit simplification as follows:

$p_0 = p_1 = 1$,  $x_0 = x_1 = y_0 = y_1 = t = 0$ $F_{out} = (1-p_k)(s_k \oplus x_k)(w_{kj} \oplus y_k) \oplus a_{kj}$ if $c_j = (0)(s_0)(w_{0j}) \oplus a_{0j} \oplus (0)(s_1)(w_{1j}) \oplus a_{1j} \oplus (1 - (s_k \oplus x_k)p_k)$ $(s_{1-k} \oplus x_{1-k})p_{1-k} \oplus F_{in} \oplus 1 \cdot 1(s_0)(s_1)((w_{0j}) \oplus (w_{1j}) \oplus (w_{0j})(w_{1j}))$;

and the plurality of switches directs the forward input $F_{in}$ to the forward output $F_{out}$ if $1(s_0) \oplus (0)(s_0)(w_{0j}) \oplus a_{0j} \neq 1(s_1) \oplus (0)(s_1)(w_{1j}) \oplus a_{1j}$.

In above formulas assume first that $k=0$, $F_{out}=a_{0j}$ if $s_0 \oplus a_{0j} = s_1 \oplus a_{1j}$.

$c_j = a_{0j} \oplus a_{1j} \oplus (1-s_0)s_1 \oplus F_{in} \oplus s_0 \cdot s_1 \cdot ((w_{0j}) \oplus (w_{1j}) \oplus (w_{0j})(w_{1j}))$.

the plurality of switches directs the forward input $F_{in}$ to the forward output $F_{out}$ if $s_0 \oplus a_{0j} \neq s_1 \oplus a_{1j}$.
or that k=1, $F_{out}=a_{1j}$ if $s_0 \oplus a_{0j} = s_1 \oplus a_{1j}$.

$c_j = a_{0j} \oplus a_{1j} \oplus (1-s_1)s_0 \oplus F_{in} \oplus s_0 \cdot s_1 \cdot ((w_{0j}) \oplus (w_{1j}) \oplus (w_{0j})(w_{1j}))$.

the plurality of switches directs the forward input $F_{in}$ to the forward output $F_{out}$ if $s_0 \oplus a_{0j} \neq s_1 \oplus a_{1j}$.

This simplification can now be implemented in switching, i.e., in the plurality of switches 24. More details below.

One embodiment of this species to computing the result reflects the following. The integers $a_0$ and $a_1$ can be represented in extended forms to a position q+2 {two's complement in (q+2) bits } as follows:

$$a_0 = (a_{0q+2})a_{0q+1}a_{0q} \ldots a_{01},$$

$$a_1 = (a_{1q+2})a_{1q+1}a_{1q} \ldots a_{11},$$

where extended bits satisfy the following equalities: $a_{0q+2} = a_{0q+1} = a_{0q}$ and $a_{1q+2} = a_{1q+1} = a_{1q}$. For additional bits, let digits $a_{00} = a_{10} = 0$. The parameters $s_0$ and $s_1$ are uniquely defined in the expression $^c s_0 s_1 = \pm a_0 \pm a_1$. If the signs for the expression $^c s_0 s_1$ are identical, for any bit position j between (q+2≧j≧1) let i be the maximal bit position to the right less than the bit position j (j>i) where bits $a_{0i}$ and $a_{1i}$ are identical. Example 14 illustrates the bit locations of j and i where bits $a_{0i}$ and $a_{1i}$ are same.

Example 14

```
        j   i
a_0j  1 0 1 1 0
a_1j  0 1 1 1 0
```

Similarly, if the signs for the expression $^c s_0 s_1$ are different, for any bit position j between (q+2≧j≧1) let i be the maximal bit position to the right less than the bit position j (j>i) where bits $a_{0i}$ and $a_{1i}$ are different. Example 15 illustrates the bit locations of j and i where bits $a_{0i}$ and $a_{1i}$ are different.

Example 15

```
        j   i
a_0j  0 0 0 1 0
a_1j  0 0 1 1 0
```

In Examples 14 and 15, i can be found. But if in other examples i≧1 cannot be found, then assume that i=0.

Temporary binary digits $c_j$ (q+2≧j≧1) can be obtained as follows. Among the bits $a_{0j}$, $a_{1j}$, $a_{s1i}$ two are identical (example 6); (if $s_1=0$ then $\underline{s}_1 i = a_{0i}$, if $s_1=1$ then $^a s_1 i = a_{1i}$). Let $c_j$ be equal to the remaining bit. If the product $s_0 \cdot s_1 = 0$, the integer $^c s_0 s_1$ has following q+2 bit representation: $^c s_0 s_1 = (c_{q+2})c_{q+1}c_q \ldots c_1 = (\underline{c}_{q+2})\underline{c}_{q+1}\underline{c}_q \ldots \underline{c}_1$ where $(c_{q+2}) = (\underline{c}_{q+2})$ is a sign bit.

If $s_0 = s_1 = 1$, the digits $\underline{c}_j$ (q+2≧j≧1) form the opposite number to $c_{11}$. That is, $c_{11} = -(\underline{c}(\underline{c}_{q+2})\underline{c}_{q+1}\underline{c}_q \ldots \underline{c}_1$. The previously-described procedure for obtaining the opposite integers is then applied: $-(\underline{c}_{q+2})\underline{c}_{q+1}\underline{c}_q \ldots \underline{c}_1 = (c_{q+2})c_{q+1}c_q \ldots c_1$. The plurality of switches 24 can implement this switching.

Second Embodiment of Third Species

A second embodiment of computing the result reflects the following. Again, the integers $a_0$ and $a_1$ can be represented in extended forms to a position q+2 {two's complement in (q+2) bits} as follows:

$$a_0 = (a_{0q+2})a_{0q+1}a_{0q} \ldots a_{01},$$

$$a_1 = (a_{1q+2})a_{1q+1}a_{1q} \ldots a_{11},$$

where extended bits satisfy the equalities: $a_{0q+2} = a_{0q+1} = a_{0q}$ and $a_{1q+2} = a_{1q+1} = a_{1q}$. For additional bits, let digits $a_{00} = a_{10} = 0$. The parameters $s_0$ and $s_1$ are uniquely defined in the expression $^c s_0 s_1 = \pm a_0 \pm a_1$. If the signs at the integers $a_0$ and $a_1$ are the same ($s_0 = s_1$), mark first integer $a_0$. If the signs are different, the integer which has a + ('plus') sign is marked and on 0__position of the marked integer, change the bit that was assumed to be 0 into 1 ('one').

Compare the two sins at the integers $a_0$ and $a_1$, and compare bits at the same bit positions; if the signs at the integers are identical for the bit position m=q+2, . . . , 0 mark every position m with identical digits. See Example 12.

Example 16

```
-a_0 - a_1    -1 1 1 0 1 0 1 0
              -1 1 1 1 0 1 1 0
```

The signs at the binary numbers in Example 12 are the same (i.e., both negative), and the bits on the 0, 1, 5, 6, and 7 positions are the same, but the bits at the other positions are different.

Similarly, compare the two signs at the integers $a_0$ and $a_1$, and compare bits at the same bit positions; if the signs at the integers are different for the bit position m=q+2, . . . , 0 mark every position m with different digits.

In the marked integer and each of the marked positions there is an ebit; for the marked integer, the position m and the value (0 or 1) of every ebit is defined. From a next position of any ebit up to a next marked position (or to the (q+2)__position if there is no next marked position), if j is a marked position then digit $c_j$=nearby right ebit; if j is a NOTmarked position then digit $c_j$=NOTnearby right ebit.

If the product $s_0 \cdot s_1 = 0$, the integer $^c s_0 s_1$ has the following q+2 bit representation: $^c s_0 s_1 = (c_{q+2})c_{q+1}c_q \ldots c_1 = (\underline{c}_{q+2})\underline{c}_{q+1}\underline{c}_q \ldots \underline{c}_1$ where $(c_{q+2}) = (\underline{c}_{q+2})$ is a sign bit.

If $s_0 = s_1 = 1$, the digits $\underline{c}_1$ (q+2≧j≧1) form an opposite number to $c_{11}$. As described above, $c_{11} = -(\underline{c}_{q+2})\underline{c}_{q+1}\underline{c}_q \ldots \underline{c}_1$, and the previously-described procedure for obtaining the opposite integers is then applied to reach the result.

$$-(\underline{c}_{q+2})\underline{c}_{q+1}\underline{c}_q \ldots \underline{c}_1 = (c_{q+2})c_{q+1}c_q \ldots c_1$$

As an illustration of the second embodiment of the second species, in Example 17, let an integer $a_0$ with a sign be on the top row and $a_1$ with a sign be on the second row. If the signs at the integers are the same in the rightmost 0__column, put zero's in the rightmost 0__column for each and mark either the first or the second integer, for instance the first (i.e., in the first row). If the signs are different on the row where there is a 'plus' sign in 0__column put a 1 in 0__column to mark this as an emit row and put a 0 in 0__column in the other row.

Example 17

$$C_{s_0 s_1} = \pm a_0 \pm a_1 =$$

|  |  |  |  |  |  |  |
|---|---|---|---|---|---|---|
| $'s_0'$ | $a_{0q+2}$ ... $a_{0j}$ ... $a_{0i}$ ... $a_{01}$ | $(1-s_0)s_1$ |
| $s_1'$ | $a_{1q+2}$ ... $a_{1j}$ ... $a_{1i}$ ... $a_{11}$ | $(1-s_1)s_0$ |
| $= \overline{'s_0 \cdot s_1'}$ | $c_{q+2}$ ... $c_j$ ... $c_i$ ... $c_1$ | 0_column |

If the signs are identical for m=0, ..., q+2 then mark every column with identical digits; in the marked row and marked column there is an ebit. If the signs are different for m=0, ..., q+2 then mark every column with different digits; in the marked row and marked column there is an ebit.

From a next position of an ebit up to a next emit column, if the next emit column exists, or otherwise to the (q+2)_ position, if j is a marked position then the digit $\underline{c}_j$ equals the nearby right ebit; if j is not a marked position then the digit $\underline{c}_j$ is different then the nearby right ebit.

In Example 18 below, for the marked row in Example 13, each position and value of every ebit is defined and noted between bars as follows: $|e_{index}|$. On the second row in Example 14 there are bits $\underline{c}_j$ (j=q+2, ..., 1).

Example 18

|   | $|e_5|$ |   |   | $|e_4|$ $|e_3|$ $|e_2|$ |   |   | $|e_1|$ |   |   | $|e_0|$ |
|---|---|---|---|---|---|---|---|---|---|---|
| $NOTe_5$. |   | $,e_4$, | $.NOTe_4$. | $e_3, e_2, e_1$, |   | $.NOTe_1$. | | $,e_0$, | $.NOTe_0$. |

I claim:

1. An adder-subtractor device comprising:

a jth device for each bit position j for computing a result c for an expression $c=\pm a_0 \pm a_1$ where $a_0$ and $a_1$ are binary numbers, the jth device being from a group consisting of devices defined by formulas using integer parameters k, $p_0$, $p_1$, t, $x_0$, $x_1$, $y_0$, and $y_1$, each said parameter having a nonnegative integer value that is less than two, the jth device including:

a line carrying an input $s_0$ representing $x_0$ when the sign at the $a_0$ number in the expression is positive, and representing $1-x_0$ when the sign at the $a_0$ number in the expression is negative;

a line carrying an input $a_{0j}$ representing a jth digit of the $a_0$ number;

a line carrying an input $s_1$ representing $x_1$ when the sign at the $a_1$ number in the expression is positive, and representing $1-x_1$ when the sign at the $a_1$ number in the expression is negative;

a line carrying an input $a_{1j}$ representing a jth digit of the $a_1$ number;

the jth device further including a line carrying an input $w_{0j}=1-y_0$ when $s_0=1-x_0$ and if any previous bit position of the $a_0$ number is 1, and $w_{0j}=y_0$ when $s_0=1-x_0$ and there is no 1 on any previous bit position, and $w_{0j}$ has a nonnegative integer value that is less than 2 when $s_0=x_0$;

the jth device further including a line carrying an input $w_{1j}=1-y_1$ when $s_1=1-x_1$ and if any previous bit position of the $a_1$ number is 1, and $w_{1j}=y_1$ when $s_1=1-x_1$ and there is no 1 on any previous bit position, and $w_{1j}$ has a nonnegative integer value that is less than 2 when $s_1=x_1$;

at least one line carrying a forward input $F_{in}$;

at least one line carrying a forward output $F_{out}$;

a line carrying an output $c_j$ representing a jth digit of the result from computing the expression $\pm a_0 \pm a_1$; and a plurality of switches, between the lines, for directing to the forward output $F_{out}$ a bit value, according to a first of said formulas:

$$F_{out}=(1-p_k)(s_k \oplus x_k)(w_{kj} \oplus y_k) \oplus a_{kj} \oplus t \text{ only if}$$

$$p_0(s_0 \oplus x_0) \oplus (1-p_0)(s_0 \oplus x_0)(w_{0j} \oplus y_0) \oplus a_{0j} = p_1(s_1 \oplus x_1) \oplus (1-p_1)(s_1 \oplus x_1)(w_{1j} \oplus y_1) \oplus a_{1j},$$

the plurality of switches also for directing the forward input $F_{in}$ to the output $c_j$ such that the output is according to a second of said formulas:

$$c_j = (1 - p_0)(s_0 \oplus x_0)(w_{0j} \oplus y_0) \oplus a_{0j} \oplus (1 - p_1)(s_1 \oplus x_1)$$

$$(w_{1j} \oplus y_1) \oplus a_{1j} \oplus (1 - (s_k \oplus x_k)p_k)(s_{1-k} \oplus x_{1-k})p_{1-k} \oplus t \oplus F_{in}$$

$$\oplus p_0 \cdot p_1(s_0 \oplus x_0)(s_1 \oplus x_1)((w_{0j} \oplus y_0) \oplus (w_{1j} \oplus y_1) \oplus (w_{0j} \oplus y_0)(w_{1j} \oplus y_1)).$$

2. The adder-subtractor of claim 1, wherein said plurality of switches includes switches to direct the forward input $F_{in}$ to the forward output $F_{out}$ if $$p_0(s_0 \oplus x_0) \oplus (1-p_0)(s_0 \oplus x_0)(w_{0j} \oplus y_0) \oplus a_{0j} \neq p_1(s_1 \oplus x_1) \oplus (1-p_1)(s_1 \oplus x_1)(w_{1j} \oplus y_1) \oplus a_{1j}.$$

3. The adder-subtractor device of claim 2, wherein:

the nonnegative integer values for the parameters are such that $s_0 \oplus x_0 = s_1 + x_1 = 0$, so as to compute a result c for a simplified version of the expression $c = \pm a_0 \pm a_1$, the simplified version being $c = a_0 + a_1$, such that the plurality of switches, between the lines, for directing to the forward output $F_{out}$ the bit value, directs according to a simplified version of the first of said formulas:

$$F_{out}=a_{kj} \text{ if } a_{0j}=a_{1j};$$

and wherein the plurality of switches also directs according to a simplified version of the second of said formulas:

$$c_j=a_{0j} \oplus a_{1j} \oplus F_{in};$$

and wherein the plurality of switches directs the forward input $F_{in}$ to the forward output $F_{out}$ if $a_{0j} \neq a_{1j}$.

4. The adder-subtractor device of claim 2, wherein:

the nonnegative integer values for the parameters are such that $t=s_0 \oplus x_0=0$ and $s_1 \oplus x_1=1$, so as to compute a result c for a simplified version of the expression $c=\pm a_0 \pm a_1$, the simplified version being $c=a_0-a_1$, such that the plurality of switches, between the lines, for directing to the forward output $F_{out}$ the bit value, directs the forward input $F_{in}$ to the forward output $F_{out}$ if $a_{0j} \neq 1-a_{1j}$.

5. The adder-subtractor device of claim 2, wherein:

the nonnegative integer values for the parameters are such that $p_0 \cdot p_1 = t = 0$ and $k=p_0$, such that the plurality of switches, between the lines, for directing to the forward output $F_{out}$ the bit value, directs according to a simplified version of the first of said formulas, provided that if j=1 then $F_{in}=p_{1-k} \cdot s_{1-k}$:

$$F_{out}=(1-p_k)(s_k \oplus x_k)(w_{kj} \oplus y_k) \oplus a_{kj} \text{ if}$$

$$p_0(s_0 \oplus x_0) \oplus (1-p_0)(s_0 \oplus x_0)(w_{0j} \oplus y_0) \oplus a_{0j} = p_1(s_1 \oplus x_1) \oplus (1-$$

$p_1)(s_1 \oplus x_1)(w_{1j} \oplus y_1) \oplus a_{1j}$ and $F_{out} = F_{in}$ otherwise;

and the plurality of switches, also for directing the forward input $F_{in}$ to the output $c_j$ according to a simplified version of the second of said formulas:

$c_j = F_{in}$ if $p_0(s_0 \oplus x_0) \oplus (1-p_0)(s_0 \oplus x_0)(w_{0j} \oplus y_0) \oplus a_{0j} = p_1(s_1 \oplus x_1) \oplus (1-p_1)(s_1 \oplus x_1)(w_{1j} \oplus y_1) \oplus a_{1j}$ and $c_j = 1 - F_{in}$ otherwise.

6. The adder-subtractor of claim 5, wherein:

said line carrying said forward input conducts a mix of a first bit 1 and a second bit 1 to a first Λ switch in said plurality of switches for directing, the first Λ switch being controlled by a first control variable signal $s_0$ such that if the control variable signal is 0, the first Λ switch passes the bit 1 signals on to a first 0X0 switch, the first 0X0 switch being controlled by a third control variable signal $a_{0j}$ such that if the third control variable said $a_{0j}$ signal is 0, then the mix is supplied to a means for filtering out a first of the bit 1 signals and input a second of the bit 1 signals to a third Λ switch, but if the first control variable signal $s_0$ is 1, the mix is input to a second Λ switch, the second Λ switch being controlled by the second control variable $w_{0j}$ such that outputs from the second Λ switch are fed as inputs to the first 0X0 switch such that when the first control variable signal $s_0$ is 1 and the second control variable $w_{0j}$ is 1 and said line carrying an input $a_{0j}$ is 0, the mix is supplied to a filter to produce a remaining first bit 1 from the mix, such that the third Λ switch being controlled by fourth control variable $s_1$ is supplied the remaining bit signal from the mix so that the outputs of third Λ switch are input to second 0X0 switch, the second 0X0 switch being controlled said line carrying the input $a_{1j}$ such that when $s_1$ is 1, and when the input $a_{1j}$ is 0, an output from the second 0X0 switch is conducted to a filter such that only the first bit 1 is passed to a first forward output line, and when $s_1$ is 0 and when the input $a_{1j}$ is 0, a second output from the second 0X0 switch is conducted to a filter and only the second bit 1 is passed on to the second forward output; and further comprising a second line carrying a second forward input to a fourth Λ switch, the second forward input being one from the pair consisting of the first bit 1 and the second bit 1, the fourth Λ switch being controlled by the first control variable $s_0$ such that if $s_0 = 0$, then the one bit 1 passes on as an input to a third 0X0 switch, but if the $s_0 = 1$, the one bit 1 is fed as an input to the fifth Λ switch, the fifth Λ switch being controlled by the second control variable $w_{0j}$ such that outputs are fed as inputs to the third 0X0 switch, the third 0X0 switch being controlled by the third control variable on the line carrying the input $a_{0j}$, such that the outputs third 0X0 switch are fed as inputs to a fourth 0X0 switch, the fourth 0X0 switch being controlled by the fourth control variable $s_1$ such that outputs from the fourth 0X0 switch are fed as inputs fifth 0X0 switch, the fifth 0X0 switch being controlled by the fifth control variable $a_{1j}$ such that outputs from the fifth 0X0 switch are conducted to the forward output line and to the line outputting $c_j$, and when the control variables $s_0 = 1$, $w_{0j} = 1$, $a_{0j} = 0$, $s_1 = 0$, and $a_{1j} = 0$, output from the fifth 0X0 switch is conducted to a filter such that if the first bit 1 is received as the second forward input, the filter passes that first bit 1 to the forward output, and if the second bit 1 is received as the second forward input, the filter passes that second bit 1 to the second forward output line and to the line outputting $c_j$, but if the control variables $s_0 = 0$, $a_{0j} = 0$, $s_1 = 0$ and $a_{1j} = 0$, the filter passes the first bit 1 to the line outputting $c_j$; and wherein the line carrying an input $w_{0j}$ conducts to the line carrying an input $a_{0j}$ via a 00N switch in said plurality of switches for directing, said 00N switch being controlled by one of the control variables from a group consisting of $a_{0j}$ and $w_{0j}$.

7. The adder-subtractor of claim 2, wherein j is greater than 1.

8. The adder-subtractor of claim 7, wherein, prior to receipt of the $F_{in}$ signal by each said jth device, each said line carrying the forward input $F_{in}$ is simultaneously connected by setting a path through the switches of each said jth device to each said line carrying the output $c_j$.

9. The adder-subtractor of claim 8, wherein at least one of said lines carries a mix of bits.

10. The adder-subtractor of claim 1, wherein j is greater than 1.

11. The adder-subtractor of claim 10, wherein, prior to receipt of the $F_{in}$ signal by each said jth device, each said line carrying the forward input $F_{in}$ is simultaneously connected by setting a path through the switches of each said jth device to each said line carrying the output $c_j$.

12. The adder-subtractor of claim 11, wherein at least one of said lines carries a mix of bits.

13. The adder-subtractor device of claim 1, wherein:

the nonnegative integer values for the parameters are such that $p_0 \cdot p_1 = t = 0$ and $k = p_0$, such that the plurality of switches, between the lines, for directing to the forward output $F_{out}$ the bit value, directs according to a simplified version of the first of said formulas, provided that if j=1 then $F_{in} = p_{1-k} \cdot s_{1-k}$:

$F_{out} = (1-p_k)(s_k \oplus x_k)(w_{kj} \oplus y_k) \oplus a_{kj}$ if $p_0(s_0 \oplus x_0) \oplus (1-p_0)(s_0 \oplus x_0)(w_{0j} \oplus y_0) \oplus a_{0j} = p_1(s_1 \oplus x_1) \oplus (1-p_1)(s_1 \oplus x_1)(w_{1j} \oplus y_1) \oplus a_{1j}$ and $F_{out} = F_{in}$ otherwise;

and the plurality of switches, also for directing the forward input $F_{in}$ to the output $c_j$ such that the output is according to the other of said formulas directs according to a simplified version of the second of said formulas:

$c_j = F_{in}$ if $p_0(s_0 \oplus x_0) \oplus (1-p_0)(s_0 \oplus x_0)(w_{0j} \oplus y_0) \oplus a_{0j} = p_1(s_1 \oplus x_1) \oplus (1-p_1)(s_1 \oplus x_1)(w_{1j} \oplus y_1) \oplus a_{1j}$ and $c_j = 1 - F_{in}$ otherwise.

14. The adder-subtractor device of claim 1, wherein:

the nonnegative integer values for the parameters are such that $s_0 \oplus x_0 = 0$ and $p_0 = p_1 = 1$, so as to compute a result c for a simplified version of the expression $c = \pm a_0 \pm a_1$, the simplified version being $c = a_0 \pm a_1$, such that the plurality of switches, between the lines, for directing to the forward output $F_{out}$ the bit value, directs according to a simplified version of the first of said formulas:

$F_{out} = a_{kj} \oplus t$ if $a_{0j} = s_1 \oplus x_1 \oplus a_{1j}$;

and wherein the plurality of switches also directs according to a simplified version of the second of said formulas:

$$c_j = a_{0j} \oplus a_{1j} \oplus s_{1-k} \oplus x_{1-k} \oplus t \oplus F_{in}.$$

15. The adder-subtractor device of claim 1, wherein:

the nonnegative integer values for the parameters are such that $s_0 \oplus x_0 = 0$ and $p_0 = p_1 = 1$, so as to compute a result c for a simplified version of the expression $c = \pm a_0 \pm a_1$, the simplified version being $c = a_0 \pm a_1$, such that the plurality of switches, between the lines, for directing to the forward output $F_{out}$ the bit value, directs the forward input $F_{in}$ to the forward output $F_{out}$ if $a_{0j} \ne s_1 \oplus x_1 \oplus a_{1j}$.

16. The adder-subtractor device of claim 1, wherein:

the nonnegative integer values for the parameters are such that $s_0 + x_0 = t = 0$ and $s_1 \oplus x_1 32\ 1$, so as to compute a result c for a simplified version of the expression $c = \pm a_0 \pm a_1$, the simplified version being $c = a_0 - a_1$, such that the plurality of switches, between the lines, for directing to the forward output $F_{out}$ the bit value, directs according to a simplified version of the first of said formulas:

$$F_{out} = a_{kj} \text{ if } a_{0j} = 1 - a_{1j};$$

and wherein the plurality of switches also directs according to a simplified version of the second of said formulas:

$$c_j = a_{0j} \oplus a_{1j} \oplus s_{1-k} \oplus x_{1-k} \oplus F_{in}.$$

17. The adder-subtractor device of claim 1, wherein:

the nonnegative integer values for the parameters are such that $s_0 \oplus x_0 = s_1 + x_1 = 0$, so as to compute a result c for a simplified version of the expression $c = \pm a_0 \pm a_1$, the simplified version being $c = a_0 + a_1$, such that the plurality of switches, between the lines, for directing to the forward output $F_{out}$ the bit value, directs according to a simplified version of the first of said formulas:

$$F_{out} = a_{kj} \text{ if } a_{0j} = a_{1j};$$

and wherein the plurality of switches also directs according to a simplified version of the second of said formulas:

$$c_j = a_{0j} \oplus a_{1j} \oplus F_{in}.$$

18. The adder-subtractor of claim 1, wherein:

said line carrying said forward input connects to a first Λ switch in said plurality of switches for directing, the first Λ switch being controlled by a first control variable signal $s_0$ such that if the control variable $s_0$ is zero, the first Λ switch passes the signal input on to a first 0X0 switch, but when the value of the control variable $s_0$ is 1, the output from the first Λ switch is applied as an input to a second Λ switch, the outputs from the second Λ switch are fed as inputs to the first 0X0 switch, the outputs from the first 0X0 switch are fed as inputs to a second 0X0 switch, the outputs from the second 0X0 switch are fed as inputs to a third 0X0 switch, such that one of the outputs from the third 0X0 switch is fed to the line outputting $c_j$ and an other of the outputs is fed to a first forward output, when control variables are 1, 1, 0, 0, and 0, respectively, at the first Λ switch, at the second Λ switch, at the first 0X0 switch, at the second 0X0 switch and at the third 0X0 switch then the signal passes to the forward output, when the control variables are 0, 0, 0, and 0, respectively, at the first Λ switch, at the first 0X0 switch, at the second 0X0 switch and at the third 0X0 switch, the said forward input passes to the line outputting $c_j$; and further comprising a second line carrying a second forward input to a third Λ switch, and if the first control variable $s_0$ at the third Λ switch is zero then the second forward input is passed on to a fourth 0X0 switch, when the control variable $s_0$ is 1, output from the third Λ switch is applied as an input to a fourth Λ switch, outputs from the fourth Λ switch are fed as inputs to the fourth 0X0 switch, the outputs from the fourth 0X0 switch are fed as inputs to a fifth 0X0 switch, outputs from the fifth 0X0 switch are fed as inputs to a first V switch, output from the first V switch is split with one of the outputs from the first V switch passing to the line outputting $c_j$ and an other of the outputs from the first V switch passing to a second forward output line; and further comprising a third line which conducts a forward input value of 1, connected to a fifth Λ switch, such that if the control variable $s_0$ at the fifth Λ switch is zero, the value of 1 is passed on and is split so that the value 1 is an input to a second V switch and value of 1 is an input to a third V switch, but when the control variable $s_0$ at the fifth Λ switch is 1, output from the fifth Λ switch is applied as an input to a sixth Λ switch such that two outputs from the sixth Λ switch are each split so that both are fed as inputs to the second V switch and as inputs to the third V switch, and output from the second V switch is applied as an input to a seventh Λ switch, and outputs from the seventh Λ switch are fed as inputs to a fourth V switch such that, when control variables are 0 and 1, respectively, at the fifth Λ switch and at the second V switch, then the value of 1 is the input to the seventh Λ switch, but when the control variables are 1, 1, and 0, respectively, at the fifth Λ switch, at the sixth Λ switch, and at the second V switch, the value of 1 is the input to the seventh Λ switch, and further, output from the second V switch is input to the seventh Λ switch, which has two outputs fed as inputs to a fourth V switch, such that, when the control variable for the seventh Λ switch is different from the control variable for the fourth V switch, the output from the second V switch is passed on to the forward output;

the output from the third V switch is an input to an eighth Λ switch, such that when the control variables are 0 and 0, respectively, at the fifth Λ switch and at the third V switch, the value of 1 is input to the eighth Λ switch, and when the control variables are 1, 1, and 1, respectively, at the fifth Λ switch, at the sixth Λ switch, and at the third V switch, the value of 1 is the input to the eight Λ switch, two outputs from the eighth Λ switch are fed as inputs to a fifth V switch, such that output from the third V switch is passed on to the second forward output if the control variable for the eighth Λ switch is equal to the control variable for the fifth V switch; wherein the first Λ switch, the third Λ switch, and the fifth Λ switch are controlled by the control variable $s_0$;

the second V switch, the first 0X0 switch, the fourth 0X0 switch, and the third V switch are controlled by the control variables $a_{0j}$;

the seventh Λ switch, the second 0X0 switch, the fifth 0X0 switch, and the eighth Λ switch are controlled by the control variable $s_1$; and the fourth V switch, the third 0X0 switch, the first V switch, and the fifth V switch are controlled by control variable $a_{1j}$.

19. The adder-subtractor of claim 18, wherein:

if j=1 the jth device receives from the line carrying the input $w_{0j}=0$, the jth device receives from the line carrying the first forward input a value of 1 if $s_1$ is 1, and further comprising a second forward input line carrying a value of 1 if $s_1$ is 0, and a second forward output, the jth device further comprises a line carrying an output $w_{0j}$ connected to the plurality of switches for directing, and if j≧2 said forward inputs to the jth device are fed from the j–1th device forward outputs and the line carrying the input $w_{0j}$ to the jth device is feed from the line carrying the $w_{0j-1}$ output from the j–1th device; and wherein:

each said jth device is arranged so that a last jth device, a second to the last jth device, and a third to the last jth device each receive identical values, respectively, on the line carrying the input $a_{0j}$ and the line carrying the input $a_{1j}$, the output $c_j$ on the line from the last jth device also represents a sign of the result; and further comprising plurality of switches for determining whether the result has a value out of a range, the plurality of switches for determing comprising:

the line carrying the output $c_j$ from the second to the last jth device is input to a first 0ON switch controlled by the output $c_j$ from the third to the last jth device and output from the first 0ON switch is input to a last Λ switch controlled by the output $c_j$ from the last jth device, such that when the output $c_j$ from the third to the last jth device is 1, the last Λ switch passes output to a line that represents underflow and second output from the last Λ switch represents overflow; and the line carrying the output $c_j$ from the third to the last jth device is input to a second 0ON switch controlled by the output $c_j$ from the second to the last jth device such that when the output $c_j$ from the second to the last jth device is 0, the second Λ switch passes output to a line that represents the overflow.

20. The adder-subtractor of claim 1, wherein:

if j=1 the jth device receives from the line carrying the input $w_{0j}=0$, and comprising a second forward input line carrying the first bit 1 if $s_1$ is 1, and carrying the second bit 1 if $s_1$ is 0, and if j≧1 the jth device receives from the line carrying the first forward input a mix of a first bit 1 and a second bit 1, and further a second forward output, the jth device further comprises a line carrying an output $w_{0j}$ connected to the plurality of switches for directing, and if j≧2 the second forward input to the jth device is fed from the j–1th device forward output and the line carrying the input $w_{0j}$ to the jth device is fed from the line carrying the $w_{0j-1}$ output from the j–1th device; and wherein:

each said jth device is arranged so that a last jth device, a second to the last jth device, and a third to the last jth device each receive identical values, respectively, on the line carrying the input $a_{0j}$ and the line carrying the input $a_{1j}$, the output $c_j$ on the line from the last jth device also represents a sign of the result; and further comprising:

a plurality of switches for determining whether the result has a value out of a range, the plurality of switches for determining comprising:

the line carrying the output $c_j$ from the second to the last jth device is input to a first 0ON switch controlled by the output $c_j$ from the third to the last jth device and output from the first 0ON switch is input to a last Λ switch controlled by the output $c_j$ from the last jth device, such that when the output $c_j$ from the third to the last jth device is 1, the last Λ switch passes output to a line that represents underflow and second output from the last Λ switch represents overflow;

the line carrying the output $c_j$ from the third to the last jth device is input to a second 0ON switch controlled by the output $c_j$ from the second to the last jth device such that when the output $c_j$ from the second to the last jth device is 0, the second Λ switch passes output to a line that represents the overflow.

21. The adder-subtractor of any one of claims 1–20, wherein at least some of the lines are electrically conducting lines.

22. The adder-subtractor of any one of claims 1–20, wherein at least some of the lines are optically conducting lines.

23. The adder-subtractor of any one of claims 1–20, wherein all said $c_j$ outputs are obtained one clock cycle by setting all said switches during said one clock cycle.

24. The adder-subtractor of claim 3, wherein:

said adder-subtractor device is comprised of at least three of said jth devices and the output $c_j$ from the last, second to last, and third to the last of the jth devices are conveyed to means for comparing to produce an output signal representing overflow.

25. The adder-subtractor of claim 7, wherein:

said adder-subtractor device is comprised of at least three of said jth devices and the output $c_j$ from the last, second to last, and third to the last of the jth devices are conveyed to means for comparing to produce an output signal representing overflow.

26. A method for making an adder-subtractor device, the method comprising the steps as follows:

inserting any nonnegative integer value less than 2 in parameters k, $p_0$, $p_1$, t, $x_0$, $x_1$, $y_0$, and $y_1$ of formulas specifying an output $c_j$ and a forward output $F_{out}$ with respect to a forward input $F_{in}$:

$$c_j = (1 - p_0)(s_0 \oplus x_0)(w_{0j} \oplus y_0) \oplus a_{0j} \oplus (1 - p_1)(s_1 \oplus x_1)$$

$$(w_{1j} \oplus y_1) \oplus a_{1j} \oplus (1 - (s_k \oplus x_k)p_k)(s_{1-k} \oplus x_{1-k})p_{1-k} \oplus t \oplus F_{in}$$

$$\oplus p_0 \cdot p_1(s_0 \oplus x_0)(s_1 \oplus x_1)((w_{0j} \oplus y_0) \oplus (w_{1j} \oplus y_1) \oplus (w_{0j} \oplus y_0)(w_{1j} \oplus y_1)),$$

and $$F_{out} = (1 - p_k)(s_k \oplus x_k)(w_{kj} \oplus y_k) \oplus a_{kj} \oplus t \quad \text{if}$$

$$p_0(s_0 \oplus x_0) \oplus (1 - p_0)(s_0 \oplus x_0)(w_{0j} \oplus y_0) \oplus a_{0j} =$$

$$p_1(s_1 \oplus x_1) \oplus (1 - p_1)(s_1 \oplus x_1)(w_{1j} \oplus y_1) \oplus a_{1j}$$

to obtain a representation of switching for a jth device for each bit position j, to compute a result c for an expression c=±$a_0$±$a_1$ where $a_0$ and $a_1$ are binary numbers;

connecting a plurality of switches in each said jth device according to said representation so that each said jth device includes:

(1) a line carrying an input corresponding to the $s_0$ parameter, representing the $x_0$ parameter when the sign at the $a_0$ number in the expression is positive and representing 1 minus the $x_0$ parameter when the sign at the $a_0$ number in the expression is negative;

(2) a line carrying an input corresponding to the $a_{0j}$ parameter, representing a jth digit of the $a_0$ number;

(3) a line carrying an input corresponding to the $s_1$ parameter, representing the $x_1$ parameter when the sign at the $a_1$ number in the expression is positive, and representing 1 minus the $x_1$ parameter when the sign at the $a_1$ number in the expression is negative;

(4) a line carrying an input $a_{1j}$ representing a jth digit of the $a_1$ number;

(5) the jth device further including a line carrying an input for the parameters $w_{0j}=1-y_0$ when $s_0=1-x_0$ and if any previous bit position of the $a_0$ number is 1, and $w_{0j}=y_0$ when $s_0=1-x_0$ and there is no 1 on any previous bit position, and $w_{0j}$ has a nonnegative integer value that is less than 2 when $s_0=x_0$;

(6) the jth device further including a line carrying an input for the parameters $w_{1j}=1-y_1$ when $s_1=1-x_1$ and if any previous bit position of the $a_1$ number is 1, and $w_{1j}=y_1$ when $s_1=1-x_1$ and there is no 1 on any previous bit position, and $w_{1j}$ has a nonnegative integer value that is less than 2 when $s_1=x_1$;

(7) at least one line carrying the forward input $F_{in}$;

(8) at least one line carrying the forward output $F_{out}$;

(9) a line carrying the output $c_j$ representing a jth digit of the result from computing the expression $\pm a_0 \pm a_1$; and

(10) a plurality of switches, between the lines, for directing the forward input $F_{in}$ to the output $c_j$ such that the output is according to said representation corresponding to the formula for $c_j$, the plurality of switches also for directing to the forward output $F_{out}$ a bit value, according to said representation corresponding to the formula for $F_{out}$.

27. An adder-subtractor device make by the process set forth in claim 26.

* * * * *